(12) United States Patent
Bessho et al.

(10) Patent No.: US 7,624,716 B2
(45) Date of Patent: Dec. 1, 2009

(54) BUTTERFLY VALVE TYPE THROTTLE VALVE OF INTERNAL COMBUSTION ENGINE

(75) Inventors: Takashi Bessho, Obu (JP); Makoto Fujimori, Obu (JP); Takio Suzuki, Obu (JP); Shigeru Suzuki, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 222 days.

(21) Appl. No.: 11/814,405

(22) PCT Filed: Jan. 23, 2006

(86) PCT No.: PCT/JP2006/300956

§ 371 (c)(1),
(2), (4) Date: Aug. 2, 2007

(87) PCT Pub. No.: WO2006/080273

PCT Pub. Date: Aug. 3, 2006

(65) Prior Publication Data

US 2009/0020099 A1  Jan. 22, 2009

(30) Foreign Application Priority Data

Jan. 25, 2005  (JP) .............................. 2005-017043

(51) Int. Cl.
*F02D 9/08* (2006.01)
*F02D 9/16* (2006.01)

(52) U.S. Cl. ........................ 123/337; 251/305; 251/306

(58) Field of Classification Search ................. 123/337, 123/403; 251/173, 175, 305, 306, 307
See application file for complete search history.

(56) References Cited

U.S. PATENT DOCUMENTS

| 2,978,222 A | * | 4/1961 | Henrion ...................... 251/173 |
| 3,724,812 A | * | 4/1973 | Richardson .................. 251/306 |
| 4,083,529 A | * | 4/1978 | Santy et al. .................. 251/175 |
| 5,081,972 A | | 1/1992 | Daly et al. |
| 5,181,492 A | | 1/1993 | Sausner et al. |
| 6,135,418 A | | 10/2000 | Hatton |
| 2003/0111036 A1 | | 6/2003 | Nomura et al. |
| 2006/0208212 A1 | | 9/2006 | Hannewald |

FOREIGN PATENT DOCUMENTS

| DE | 1297427 | 6/1969 |
| DE | 10310744 | 11/2004 |
| EP | 0494344 | 7/1992 |
| JP | 9329028 | 12/1997 |
| WO | 9631692 | 10/1996 |
| WO | 2004025104 | 2/2004 |

* cited by examiner

*Primary Examiner*—Mahmoud Gimie
(74) *Attorney, Agent, or Firm*—Dennison, Schultz & MacDonald

(57) ABSTRACT

A throttle valve of the invention includes a clearance closing member provided along a peripheral edge of a valve body displaceably and elastically deformable in a direction extending along an axis of an intake passage, a direction perpendicular to the axis of the intake passage, and a direction inclined with respect to the axis of the intake passage, for closing a clearance between the peripheral edge of the valve body and an inner wall surface of the intake passage.

8 Claims, 19 Drawing Sheets

BUTTERFLY VALVE TYPE THROTTLE VALVE OF INTERNAL COMBUSTION ENGINE

TECHNICAL FIELD

The present invention relates to a butterfly valve-type throttle valve employed in an internal combustion engine as, for example, a throttle valve of an intake air control device, a variable intake valve for changing over a substantial length of an intake pipe by opening/closing a partition in a surge tank, a swirl control valve for generating a swirl in the flow of intake air, or a tumble control valve.

BACKGROUND ART

The full-closure position of a throttle valve for adjusting an amount of intake air flowing into each cylinder of an internal combustion engine is set such that the throttle valve is inclined in an opening direction by a slight angle with respect to a position at which the throttle valve is perpendicular to an axis of an intake passage (i.e., such that the throttle valve does not interfere with an inner wall surface of the intake passage), because it is necessary to prevent the throttle valve from biting into (or being caught on) the inner wall surface within the intake passage (inner wall surface of a bore). Thus, a slight clearance is created between the throttle valve and the inner wall surface of the intake passage when the throttle valve is fully closed. The engine is idling when the throttle valve is fully closed. Therefore, the narrower the clearance created between the throttle valve and the inner wall surface of the intake passage during full closure of the throttle valve becomes, the lower the idling rotational speed of the engine can be achieved to reduce fuel consumption.

Thus, various modifications have been conventionally made to the butterfly valve-type throttle valve (such as the throttle valve) in order to make the clearance between the throttle valve and the inner wall surface of the intake passage as narrow as possible to reduce the amount of air leakage and hence reduce the idling rotational speed of the engine while preventing the throttle valve from biting into the inner wall surface of the intake passage when the throttle valve is at the full-closure position.

For example, according to disclosure in JP 09-329028 A, a wall portion of a valve holder is provided with a step portion, and a butterfly valve is brought into abutment on this step portion to ensure air-tightness during full-closure of the butterfly valve. According to disclosure in JP 08-277717 A, the sealability of respective intake passages and the like is secured in a so-called multi-arrayed variable intake valve or the like.

Patent Document 1: JP 09-329028 A
Patent Document 2: JP 08-277717 A

However, the related art has a problem in that the step portion of the valve holder may cause a resistance against the admission of intake air and the performance of the engine deteriorates as a result. Also, the clearance between a throttle valve according to the latter art and the inner wall surface of the intake passage cannot be reduced beyond a certain limit.

In particular, in the above-mentioned multi-arrayed variable intake valve, which is composed of a plurality of valve bodies fixed to a single valve shaft, the clearances between the respective valve bodies and the inner wall surfaces of the respective intake passages are liable to disperse when each of the valve bodies is at a full-closure position, owing to mounting errors of the respective valve bodies on the valve shaft, working errors of relevant components, or the like. It is extremely difficult to set those clearances equal to one another and narrower.

Thus, there is a need in the art to provide a butterfly valve-type throttle valve (a so-called butterfly valve) suitably employable as the above-mentioned multi-arrayed variable intake valve and makes it possible to set the clearance between the throttle valve and an inner wall surface of an intake passage narrower than before to reduce the leakage amount of inflow air while being prevented from biting into the inner wall surface of the intake passage mainly when the throttle valve is at a full-closure position or in a low-opening degree range.

SUMMARY OF THE INVENTION

Thus, according to the present invention, throttle valves constructed as set forth in the respective claims are provided.

A throttle valve of the present invention includes a clearance closing member provided along a peripheral edge of a valve body displaceably and elastically deformable in a direction extending along an axis of an intake passage, a direction perpendicular to the axis of the intake passage, and a direction inclined with respect to the intake passage, for closing a clearance between the peripheral edge of the valve body and an inner wall surface of the intake passage.

According to the present invention, while each of the throttle valves in, for example, the multi-arrayed variable intake valve device can be prevented from biting into the inner wall surface of a corresponding one of the intake passages, the clearance therebetween can be set narrower than before to reduce the leakage amount of inflow air. Thus, the control of switching over the amount of inflow air depending on whether the engine is in a high-speed rotation range or a low-speed rotation range can be performed with accuracy, so the outputting performance of the engine can be improved. When the present invention is used with a throttle valve device, the idling rotational speed of the engine can be reduced to suppress fuel consumption.

BEST MODE FOR CARRYING OUT THE INVENTION

Figure 1:
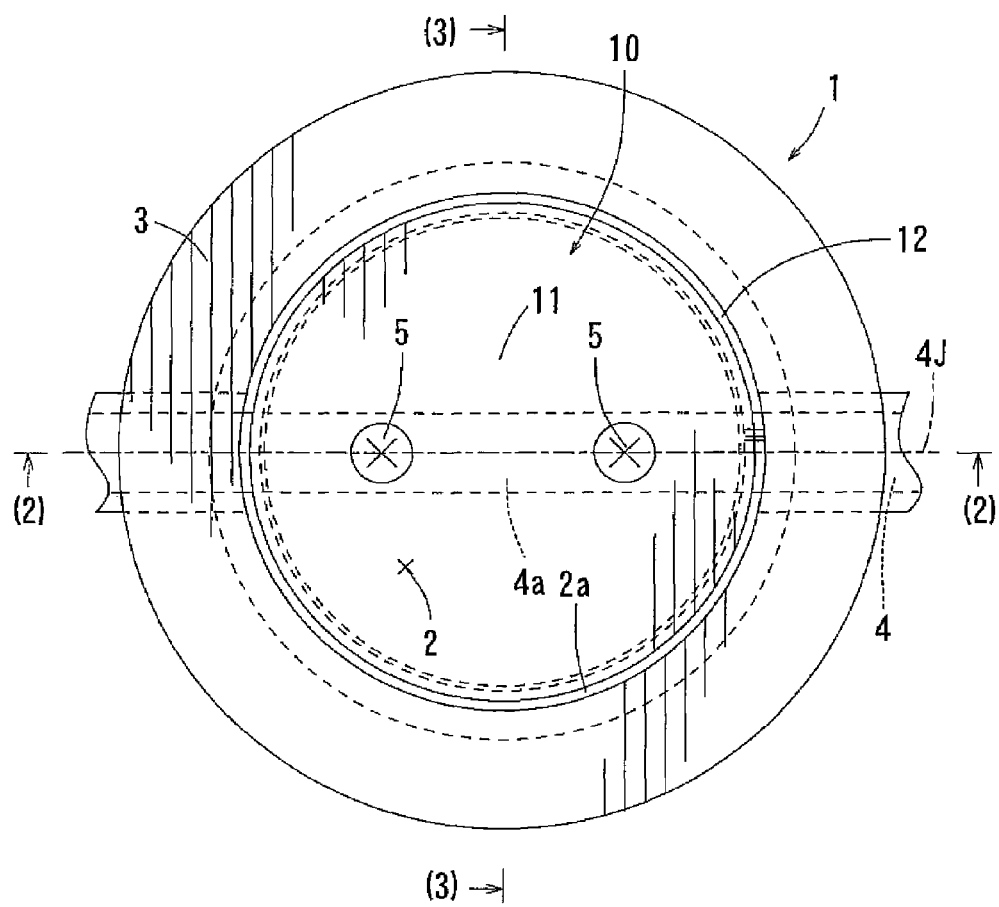
FIG. 1 is a plan view of a throttle valve according to Embodiment 1 of the present invention and an intake passage.
Figure 2:
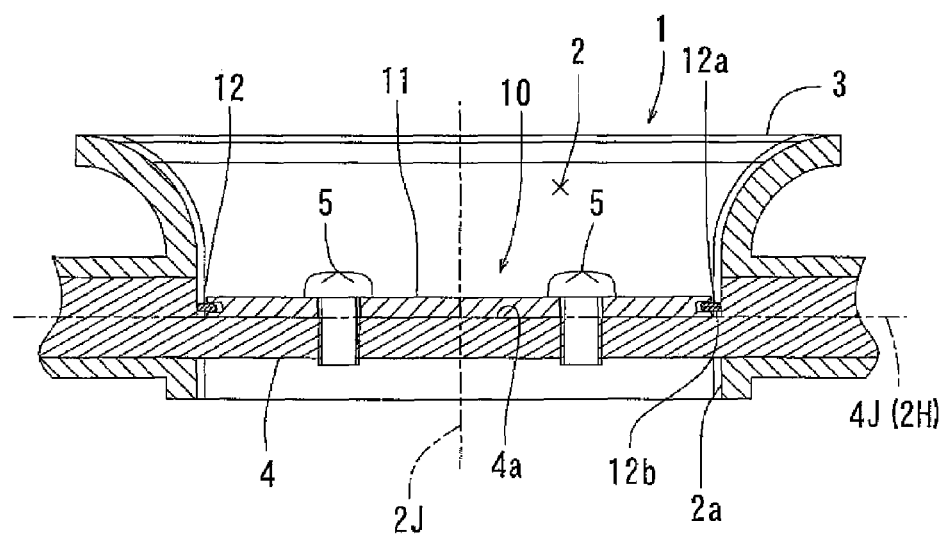
FIG. 2 is a sectional view on arrow taken along the line (2)-(2) of FIG. 1.
Figure 3:
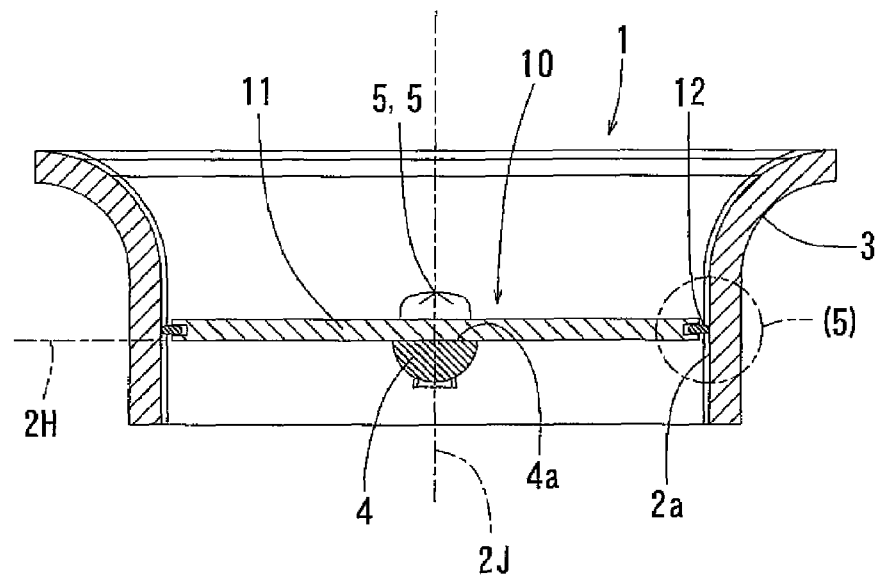
FIG. 3 is a sectional view on arrow taken along the line (3)-(3) of FIG. 1.

Embodiment 1 of the present invention will be described with reference to FIGS. 1 to 9. FIGS. 1 to 3 each show part of a multi-arrayed variable intake valve device 1 equipped with butterfly valve-type (butterfly-shaped) throttle valves 10 according to Embodiment 1 of the present invention. A single intake passage (bore) that is opened/closed by one of the throttle valves 10 is denoted by a reference symbol 2 in the figures. A plurality of intake passages 2 to 2, which are not shown in the figures, are formed in a body 3. Each one of the throttle valves 10 is disposed in a corresponding one of the intake passages 2. Referring to FIGS. 2 and 3, air flows from an upper side toward a lower side in each of the intake passages 2. Accordingly, an upper side with respect to the throttle valve 10 represents an upstream side thereof, and a lower side with respect to the throttle valve 10 represents a downstream side thereof. This holds true of FIGS. 11, 44 to 48, 50, and 51 as well as FIGS. 2 and 3.

The plurality of throttle valves 10 to 10 are fixed to a single turning shaft 4 rotatably supported by the body 3. That is, this common turning shaft 4 is fitted with the throttle valves 10 of the respective intake passages 2. Thus, the throttle valves 10 of the respective intake passages 2 are opened/closed integrally by rotating the turning shaft 4 around an axis 4J thereof. The turning shaft 4 is supported by the body 3 along an axis (rotational axis 4J) perpendicular to an axis 2J of each of the intake passages 2. The throttle valves 10, which are fixed to this turning shaft 4, rotate around the rotational axis 4J thereof to open/close the intake passages 2 respectively. In a full-closure state illustrated in FIGS. 1 to 3, the intake passage 2 is closed by the throttle valve 10. The throttle valve 10 rotates from this full-closure position in a certain direction to open the intake passage 2. As shown in Drawings, the full-closure position of the throttle valve 10 is set to a position at which the throttle valve 10 substantially extends along a horizontal axis 2H perpendicular to the axis 2J of the intake passage 2.

The turning shaft 4 is coupled on one end side thereof to an electric motor via a link arm, which is not shown in FIGS. 1 to 3. The rotation of this electric motor is controlled based on the depression stroke of an accelerator pedal and the operational state of an engine or the like (switchover between a high-rotation range and a low-rotation range). The turning shaft 4 thereby rotates around the rotational axis 4J thereof, so the opening degree of the throttle valve 10 is controlled. Due to the appropriate control of the opening degree of the throttle valve 10, the amount of air flowing through the intake passage 2 toward an engine cylinder side (downward in FIGS. 2 and 3) (i.e., the flow amount of intake air) is appropriately adjusted.

Figure 4:
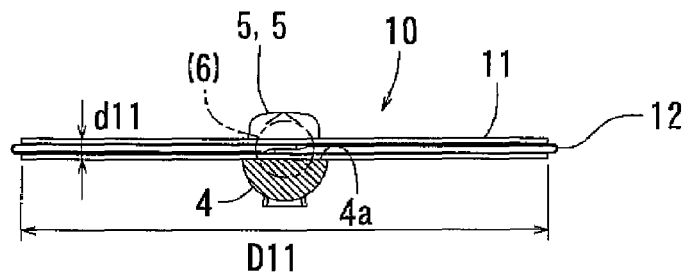
FIG. 4 is a lateral view of the throttle valve.

FIG. 4 shows one of the throttle valves 10 according to Embodiment 1 of the present invention independently. The throttle valve 10 according to Embodiment 1 of the present invention is equipped with a flat plate-shaped valve body 11, and a clearance closing member 12 fitted along a peripheral edge of the valve body 11.

The valve body 11, which is an integrally molded component made of resin, is formed with a board thickness d11 and in the shape of a circle with an outer diameter D11. This valve body 11 is fixed on a flat surface 4a provided to the turning shaft 4 by two fixing screws 5 and 5. A center of the valve body 11 is located on the axis 4J of the turning shaft 4. The valve body 11 bulges out from the turning shaft 4 radially laterally on the both sides by the same dimension.

Figure 5:
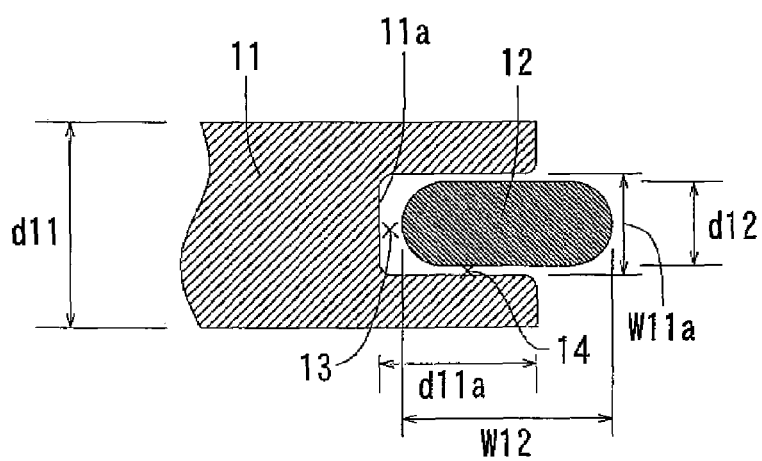
FIG. 5, which shows the region (5) of FIG. 3 on an enlarged scale, is a longitudinal sectional view of an end of a valve body.

As shown in FIG. 5, a groove portion 11a with a width W11a and a depth d11a is formed in a peripheral edge surface of the valve body 11 along an entire circumference thereof. The clearance closing member 12 is held within the groove portion 11a such that an outer periphery side of the clearance closing member 12 sticks out laterally. The clearance closing member 12 has the shape of a circular ring with a width W12 and a board thickness d12.

Figure 6:
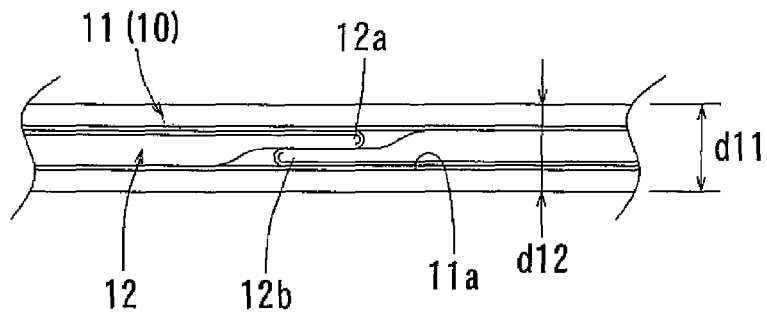
FIG. 6, which shows the region (6) of FIG. 4 on an enlarged scale, is a lateral view showing a positional relationship between ends of a clearance closing member.

As shown in FIG. 6, this clearance closing member 12 is separated off at one point in a circumferential direction thereof. The board thickness of both ends 12a and 12b of the clearance closing member 12, which are formed through the separation, is substantially reduced to half (d12/2) of the board thickness of a certain circumferential range of the clearance closing member 12. Those reduced thickness portions 12a and 12b are opposed to each other in a relatively displaceable (relatively displaceable in the circumferential direction and a radial direction) state. Thus, a certain circumferential range or the entirety of the clearance closing member 12, upon receiving an external force mainly in a radial direction thereof, is displaceable and elastically deformable in a surface direction, a board thickness direction, and a circumferential direction of the valve body 11.

Further, the outer periphery side of this clearance closing member 12, which is held in slidable contact with an inner wall surface 2a of the intake passage 2, is formed in the shape of a semicircle in cross-section. Owing to the semicircular cross-sectional shape of the outer periphery side of the clearance closing member 12, the clearance closing member 12 is unlikely to bite into the inner wall surface 2a of the intake passage 2.

The clearance closing member 12 formed as described above is fitted along the peripheral edge of the valve body 11 with the inner periphery side of the clearance closing member 12 inserted in the groove portion 11a of the valve body 11. By widening the reduced thickness portions 12a and 12b at both the ends of this clearance closing member 12 in such a direction that the reduced thickness portions 12a and 12b are made to be apart from each other (in a direction in which a diameter of the clearance closing member 12 is increased) through elastic deformation, the clearance closing member 12 can be fitted in the groove portion 11a.

In a state where the clearance closing member 12 is fitted in the groove portion 11a as shown in FIG. 5, there is a clearance 13 created between the clearance closing member 12 and a bottom of the groove portion 11a. The width W12 of the clearance closing member 12 and the depth d11a of the groove portion 11a are appropriately set such that the clearance 13 is sufficiently secured. There is also a clearance 14 created between the clearance closing member 12 and the groove portion 11a in the board thickness direction. The board thickness d12 of the clearance closing member 12 and the width W11a of the groove portion 11a are appropriately set such that the clearance 14 is sufficiently secured.

The width W12 and the board thickness d12 of the clearance closing member 12 and the width W11a and the depth d11a of the groove portion 11a are appropriately set as described above to secure the sufficient clearances 13 and 14, so the entirety or a certain circumferential range of the clearance closing member 12 is fitted in a floating state, in an elastically deformable state, within a certain range with respect to the valve body 11 in the radial direction, the board thickness direction, or a direction inclined with respect to the board thickness direction. This state is illustrated in FIGS. 7 to 9.

Figure 7:
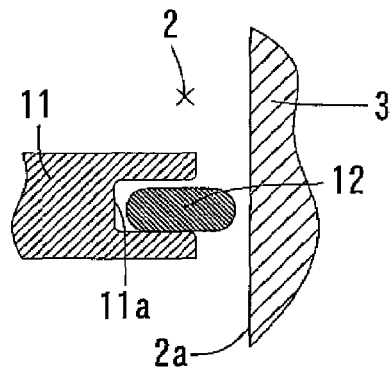
FIG. 7 is a longitudinal sectional view showing the end of the valve body in a state in which the clearance closing member is displaced or elastically deformed within a groove portion. This figure illustrates a case where the clearance closing member is, partially along a circumferential direction thereof, out of contact with an inner wall surface of an intake passage.

FIG. 7 shows that the clearance closing member 12 is displaceable (elastically deformable) within the groove portion 11a parallel to the board thickness direction of the valve body 11 within the range of the clearance 14. That is, the closure position of the throttle valve 10 is shifted with respect to the horizontal axis 2H in an opening direction. Therefore, in a state where the clearance closing member 12 is out of contact with the inner wall surface 2a of the intake passage 2, a certain circumferential range of the clearance closing member 12 is displaced (elastically deformed) downward and parallel to the board thickness direction of the valve body 11 in FIG. 7 and comes into abutment on a lateral wall of the groove portion 11a shown in a lower part of FIG. 7, due to the flow of intake air which is at negative pressure on a lower surface side of the valve body 11. Thus, the clearance between the clearance closing member 12 and the inner wall surface 2a of the intake passage 2 is made small, so the leakage amount of inflow air is reduced.

Figure 8:
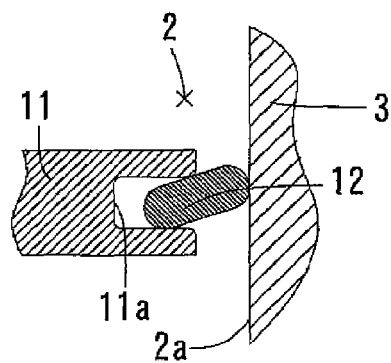
FIG. 8 is a longitudinal sectional view showing the end of the valve body in a state in which the clearance closing member is displaced or elastically deformed within the groove portion. This figure illustrates a state in which the clearance closing member is twisted, partially along the circumferential direction thereof, in such a direction as to displace a bulge-out tip side thereof upstream.
Figure 9:
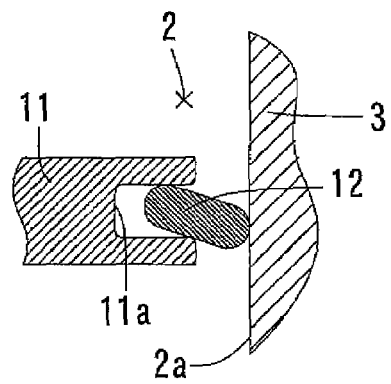
FIG. 9 is a longitudinal sectional view showing the end of the valve body in a state in which the clearance closing member is displaced or elastically deformed within the groove portion. This figure illustrates a state in which the clearance closing member is twisted, partially along the circumferential direction thereof, in such a direction as to displace the bulge-out tip side thereof downstream.

Further, as shown in FIGS. 8 and 9, as regards that range of the clearance closing member 12 which is in contact with the inner wall surface 2a of the intake passage 2, the clearance closing member 12 is inclined in a counterclockwise direction (FIG. 8) or a clockwise direction (FIG. 9) within the groove portion 11a due to a negative pressure on the lower surface side of the throttle valve 10. As a result, the adhesion of the clearance closing member 12 with respect to the inner wall surface 2a of the intake passage 2 is ensured.

According to the throttle valve 10 of Embodiment 1 of the present invention constructed as described above, the clearance closing member 12, which is fitted along the peripheral edge of the valve body 11, is provided such that a certain circumferential range or the entirety thereof is displaceable and elastically deformable within a certain range with respect to the valve body 11 in the surface direction of the valve body 11, the board thickness direction of the valve body 11, and a direction inclined with respect to the board thickness direction of the valve body 11. Thus, while the clearance closing member 12 can be prevented from biting into the inner wall surface 2a of the intake passage 2, the clearance between the valve body 11 and the inner wall surface 2a of the intake passage 2 can be closed or made small by the clearance closing member 12 to enable making the leakage amount of inflow air smaller than before.

Thus, even in a case where the closure positions of the respective throttle valves 10 (mounting positions of the respective throttle valves 10 on the common turning shaft 4) disperse and hence the opening degrees of the respective throttle valves 10 at the closed-positions thereof disperse in the multi-arrayed variable intake valve device 1, the leakage amounts of air flowing into the respective intake passages 2 can be made smaller than before.

Figure 43:
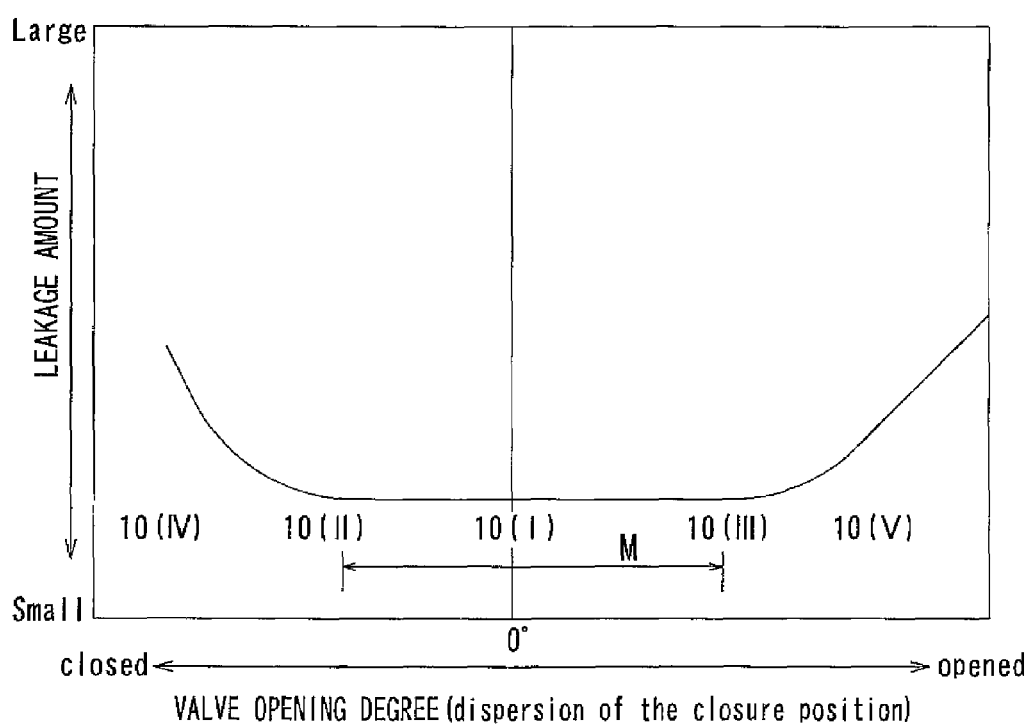
FIG. 43 is a diagram showing the leakage amount of air flowing into each of intake passages in a multi-arrayed variable intake valve device equipped with throttle valves according to Embodiment 1 of the present invention during closure thereof.

FIG. 43 shows, in a case where the fixing positions (mounting angles) of five throttle valves 10(I) to 10(V), which are fixed to the common turning shaft 4, with respect to the turning shaft 4 disperse, changes among the degrees of the sealing of the respective throttle valves 10 by the clearance closing member 12 against the inner wall surfaces 2a of the respective intake passages 2. In a chart shown in FIG. 43, the axis of abscissa represents the degree of dispersion of the closure position of each of the throttle valves 10 with respect to a corresponding one of the intake passages 2, and the axis of ordinate represents the leakage amount of inflow air at the time when each of the throttle valves 10 is at the closure position.

Further, FIGS. 44 to 48 show the five throttle valves 10(I) to 10(V), whose fixing positions (closure positions) with respect to the turning shaft 4 disperse with respect to one another. In a case where the closure position of the throttle valve 10(I) shown in FIG. 44, one of the five throttle valves 10(I) to 10(V), is set to the full-closure position (with a valve opening degree of 0°) at which the throttle valve 10(I) extends along the horizontal axis 2H perpendicular to the axis 2J of the intake passage 2, the mounting angles of the other throttle valves 10(II) to 10(V) (FIGS. 45 to 48) disperse in the opening direction or a closing direction with respect to the above-mentioned closure position as a reference position. It is assumed in FIGS. 44 to 48 that the opening direction and the closing direction of the respective throttle valves 10 are a clockwise direction and a counterclockwise direction, respectively.

Figure 44:
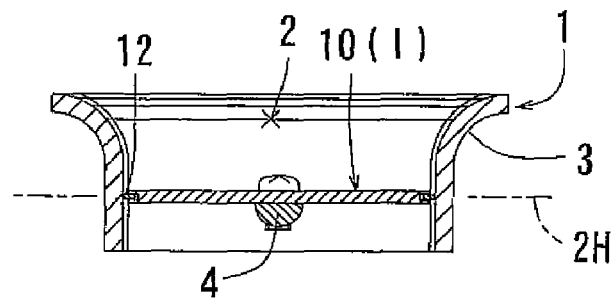
FIG. 44 is a longitudinal sectional view of the throttle valve according to Embodiment 1 of the present invention. This figure illustrates a state in which the closure position of the throttle valve is set to a full-closure position.
Figure 45:
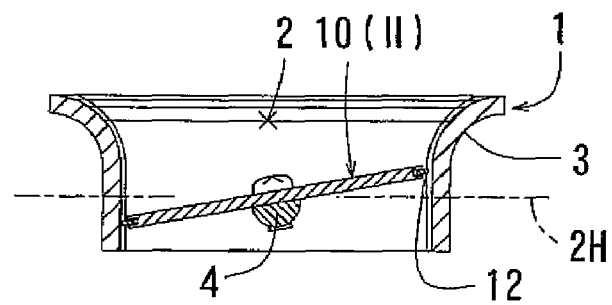
FIG. 45 is a longitudinal sectional view of the throttle valve according to Embodiment 1 of the present invention. This figure illustrates a state in which the closure position of the throttle valve is set to a position slightly shifted in a closing direction from the full-closure position.
Figure 46:
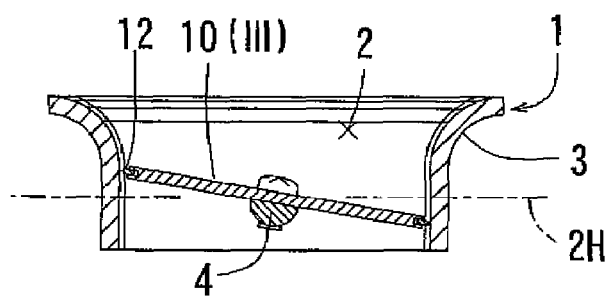
FIG. 46 is a longitudinal sectional view of the throttle valve according to Embodiment 1 of the present invention. This figure illustrates a state in which the closure position of throttle valve is set to a position slightly shifted in an opening direction from the full-closure position.
Figure 47:
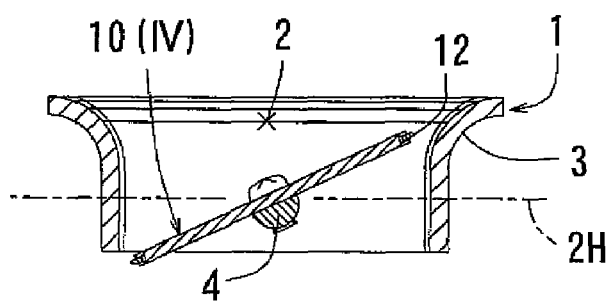
FIG. 47 is a longitudinal sectional view of the throttle valve according to Embodiment 1 of the present invention. This figure illustrates a state in which the closure position of the throttle valve is set to a position greatly shifted in the closing direction from the full-closure position.
Figure 48:
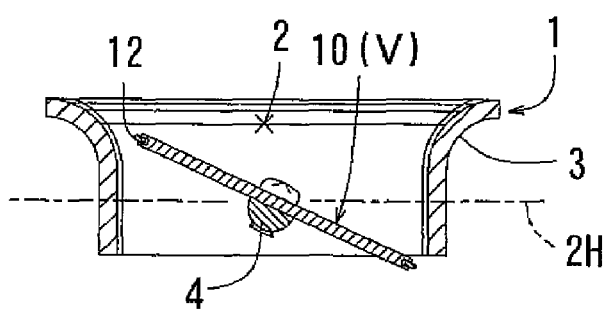
FIG. 48 is a longitudinal sectional view of the throttle valve according to Embodiment 1 of the present invention. This figure illustrates a state in which the closure position of the throttle valve is set to a position greatly shifted in the opening direction from the full-closure position.

As shown well in FIGS. 43 to 48, the flow amount of air leaking from the throttle valve 10(IV) shown in FIG. 47 (the closure position thereof is greatly shifted in the closing direction with respect to the reference position) or the throttle valve 10(V) shown in FIG. 48 (the closure position thereof is greatly shifted in the opening direction with respect to the reference position) is larger than the flow amount of air leaking from the throttle valve 10(I) shown in FIG. 44 at the time when the throttle valve 10(I) is at the closure position (the reference position). However, the same sealing performance as the throttle valve 10(I) as a reference throttle valve is substantially ensured in the throttle valve 10(II) shown in FIG. 45 (the closure position thereof is slightly shifted in the closing direction with respect to the reference position) and the throttle valve 10(III) shown in FIG. 46 (the closure position thereof is slightly shifted in the opening direction with respect to the reference position).

This is because of the following reason. That is, each of clearance closing members 12 is fitted along the peripheral edge of a corresponding one of the throttle valves 10 as described above and supported in the floating state with respect to the valve body 11, and therefore does not bite into the inner wall surface 2a of the intake passage 2. Each of the clearance closing members 12 is partially or entirely displaced or elastically deformed, so the clearance between each of the clearance closing members 12 and the inner wall surface 2a of the intake passage 2 is closed or made small.

Thus, even in the case where the closure positions of the respective throttle valves 10 disperse in the multi-arrayed variable intake valve device, the leakage amount of inflow air is made smaller than before as a whole, so the outputting performance of the engine can be improved.

Further, owing to the foregoing construction, even when the mounting positions of the throttle valves 10 disperse between the closure position of the throttle valve 10(II) and the closure position of the throttle valve 10(III), that is, within a range indicated by the arrow M shown in FIG. 43 in the multi-arrayed variable intake valve device, the flow amounts of air leaking from all the throttle valves 10 can be equalized and minimized.

Figure 49:
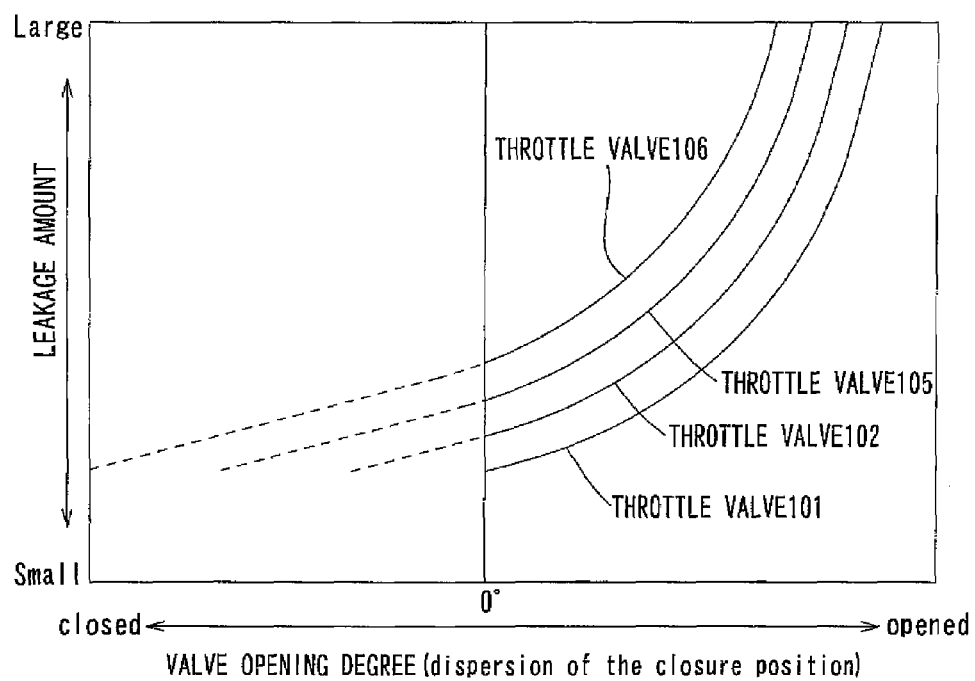
FIG. 49 is a diagram showing, for comparison, the leakage amounts of air flowing into respective intake passages in a multi-arrayed variable intake valve device equipped with throttle valves according to a conventional structure during closure thereof.
Figure 50:
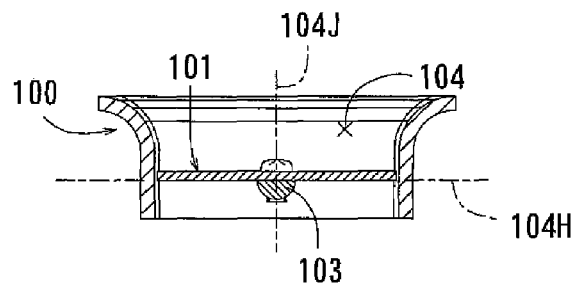
FIG. 50 is a longitudinal sectional view of a throttle valve according to the conventional structure. This figure illustrates a state in which the closure position of the throttle valve is set along a horizontal axis perpendicular to an axis of the intake passage.
Figure 51:
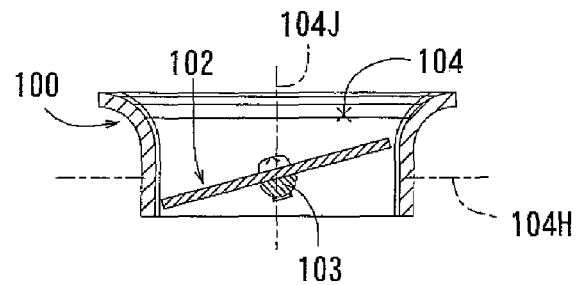
FIG. 51 is a longitudinal sectional view of the throttle valve according to the conventional structure. This figure illustrates a state in which the closure position of the throttle valve is set to a position slightly shifted in a closing direction from the horizontal axis perpendicular to the axis of the intake passage.

FIG. 49 shows, for comparison, the leaking flow amounts of a multiple variable intake device 100 with conventional throttle valves 101, 102 that do not have the clearance closing member 12 of Embodiment 1 in a closing position of each throttle valve. FIGS. 50 and 51 show the two throttle valves 101 and 102 in the aforementioned conventional multi-arrayed variable intake valve device 100, respectively. The mounting positions (mounting angles) of the two throttle valves 101 and 102, which are among a plurality of throttle valves, with respect to a common turning shaft 103 are slightly shifted from each other. On the assumption that, when the closure position of the throttle valve 101 shown in FIG. 50 is set to a full-closure position at which the throttle valve 101 extends along a horizontal axis 104H perpendicular to an axis 104J of an intake passage 104, the closure position of the other throttle valve 102 is slightly shifted in the closing direction from the closure position (reference position) of the throttle valve 102 due to a mounting error or the like, the flow amount of air leaking from the throttle valve 101 at the closure position thereof is appreciably larger than the flow amount of air leaking from the throttle valve 101 as shown in FIG. 49. In this respect, as the amount of a shift from the mounting position of the throttle valve 101, whose mounting position serves as the reference position, becomes larger than that of the throttle valve 102 (throttle valves 105 and 106 of FIG. 49), the flow amount of air leaking from each of the throttle valves at the closure position thereof increases. That is, according to the conventional arts, the differences among the leakage amounts of inflow air are large even when the closure positions disperse slightly.

As described above, each of the throttle valves 10 according to Embodiment 1 of the present invention is equipped with the clearance closing member 12 along a peripheral edge portion of the valve body 11, and the clearance closing member 12 is displaceable and elastically deformable with respect to the valve body 11 in the surface direction, the board thickness direction, and the direction inclined with respect to the board thickness direction of the valve body 11. Thus, the clearance closing member 12 is in contact with the inner wall surface 2a of the intake passage 2. As a result, the respective intake passages 2 can be ensured of higher sealability than before regardless of slight dispersion of the closure positions of the throttle valves 10.

Figure 10:
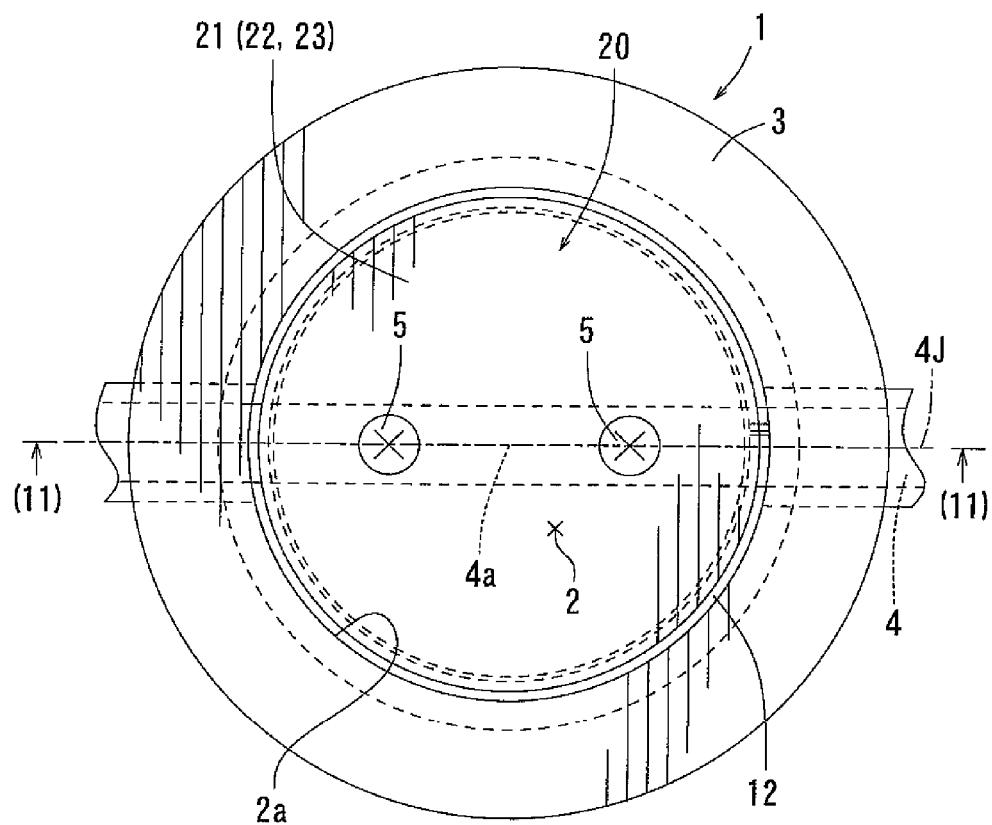
FIG. 10 is a plan view of a throttle valve according to Embodiment 2 of the present invention and an intake passage.
Figure 11:
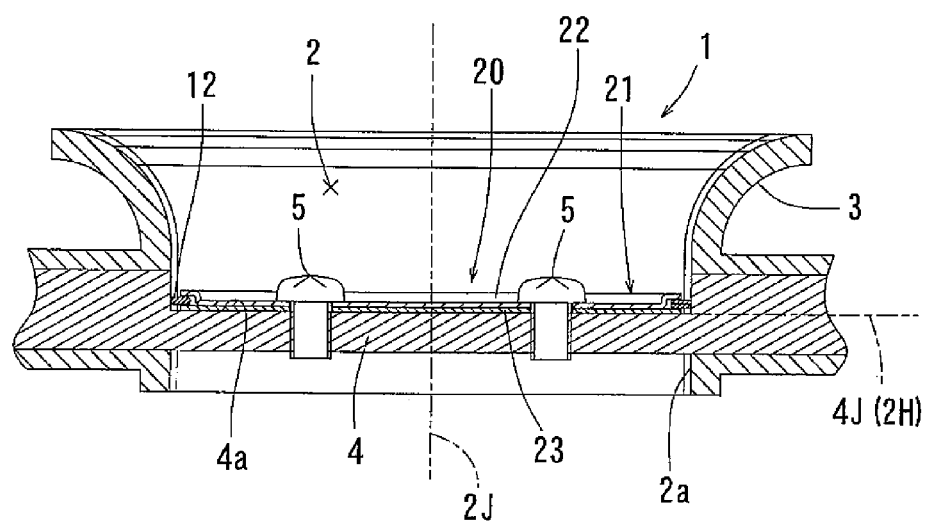
FIG. 11 is a sectional view on arrow taken along the line (11)-(11) of FIG. 10.
Figure 12:
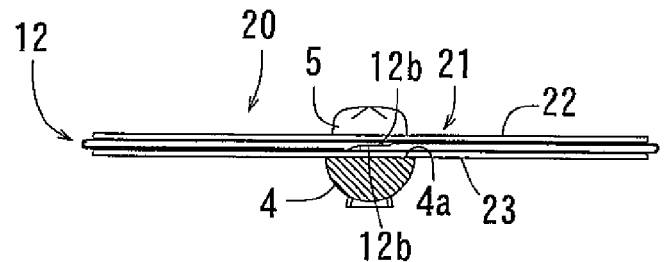
FIG. 12 is a lateral view of the throttle valve according to Embodiment 2 of the present invention.

The present invention can be carried out in various forms without being limited to Embodiment 1 of the present invention described above. For example, FIGS. 10 to 12 show a throttle valve 20 according to Embodiment 2 of the present invention. The throttle valve 20 according to Embodiment 2 of the present invention is characterized by a two-body structure in which a valve body 21 is composed of two separate valve bodies 22 and 23 joined together. Embodiment 2 of the present invention is identical to Embodiment 1 of the present invention in other respects, so the description thereof will be omitted by simply using the same reference symbols.

Each of the two separate valve bodies 22 and 23 is manufactured through press molding of a steel plate. The separate valve bodies 22 and 23, which are concentrically superposed on each other, are fixed to the flat surface 4a of the turning shaft 4 by the fixing screws 5 and 5.

Figure 13:
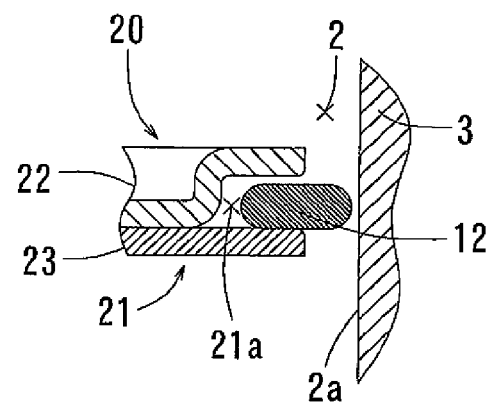
FIG. 13 is a longitudinal sectional view showing an end of a valve body according to Embodiment 2 of the present invention in a state in which a clearance closing member is displaced or elastically deformed within a groove portion. This figure illustrates a case where the clearance closing member is, partially along a circumferential direction thereof, out of contact with an inner wall surface of the intake passage.
Figure 14:
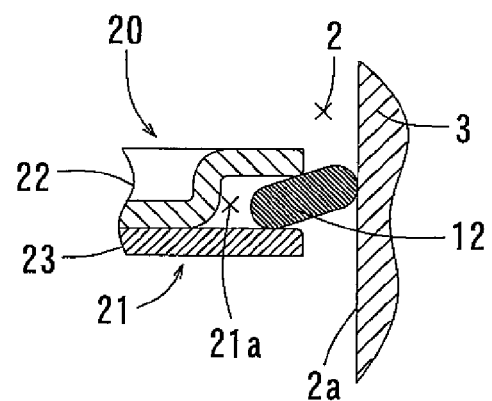
FIG. 14 is a longitudinal sectional view showing the end of the valve body according to Embodiment 2 of the present invention in a state in which the clearance closing member is displaced or elastically deformed within the groove portion. This figure illustrates a state in which the clearance closing member is twisted, partially along the circumferential direction thereof, in such a direction as to displace a bulge-out tip side thereof upstream.

A peripheral edge of the separate valve body 22, which is located upstream with respect to the flow of inflow air (in the upper part of each figure, the same will hold true hereinafter), is bent upstream in the shape of a crank as shown in FIGS. 12 to 14. A groove portion 21a corresponding to the groove portion 11a of the foregoing Embodiment 1 of the present invention is formed between the bent portion of the peripheral edge of the separate valve body 22 and a peripheral edge of the separate valve body 23, which is located downstream with respect to the flow of inflow air. The width and the depth of this groove portion 21a are set sufficiently larger than the width W12 and the board thickness d12 of the clearance closing member 12, as in the case of the foregoing Embodiment 1 of the present invention. The inner periphery side of the clearance closing member 12 is inserted along the entire circumference thereof in the groove portion 21a. Thus, the clearance closing member 12 is elastically deformable and displaceable in an arbitrary manner within a certain range in a radial direction, a board thickness direction, and a direction inclined with respect to the board thickness direction of the valve body 21.

The throttle valve 20 according to Embodiment 2 of the present invention, which is constructed as described above, can also achieve an operational effect similar to those of the foregoing Embodiment 1 of the present invention. That is, as shown in FIG. 13, when the throttle valve 20 is at the closure position, that region of the clearance closing member 12 which extends along the circumferential direction thereof over a certain range and is out of contact with the inner wall surface 2a of the intake passage 2 is elastically deformed in such a direction as to abut against a downstream-side lateral wall of the groove portion 21a (downstream) due to a negative pressure on the downstream side of the intake passage 2. Thus, the clearance between the clearance closing member 12 and the inner wall surface 2a of the intake passage 2 becomes small, so the leakage amount of inflow air is reduced.

Figure 15:
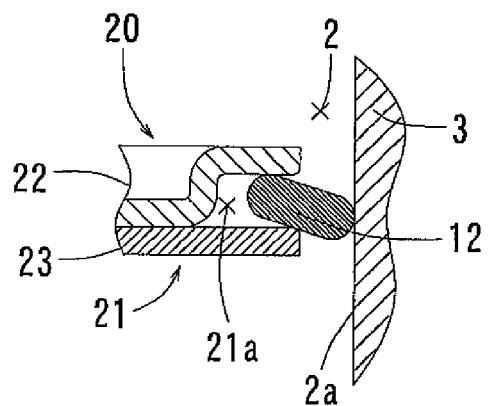
FIG. 15 is a longitudinal sectional view showing the end of the valve body according to Embodiment 2 of the present invention in a state in which the clearance closing member is displaced or elastically deformed within the groove portion. This figure illustrates a state in which the clearance closing member is twisted, partially along the circumferential direction thereof, in such a direction as to displace the bulge-out tip side thereof downstream.

Further, as shown in FIG. 14, when the throttle valve 20 is at the closure position, a certain circumferential range of the clearance closing member 12 is brought into slidable contact with the inner wall surface 2a of the intake passage 2 from the upstream side to the downstream side in accordance with the closing movement of the throttle valve and hence is elastically deformed into a counterclockwise inclined state. Thus, while the above-mentioned range of the clearance closing member 12 can be prevented from biting into the inner wall surface 2*a* of the intake passage 2, the clearance closing member 12 can be ensured of its sealability. Furthermore, as shown in FIG. 15, when the throttle valve 20 is at the closure position, the other circumferential range (the range on the opposite side of the above-mentioned range by 180°) of the clearance closing member 12 is brought into slidable contact with the inner wall surface 2*a* of the intake passage 2 from the downstream side toward the upstream side in accordance with the closing movement of the throttle valve 20 and hence is elastically deformed into a clockwise inclined state. Thus, while the above-mentioned range of the clearance closing member 12 can be prevented from biting into the inner wall surface 2*a* of the intake passage 2, the clearance closing member 12 can be ensured of its sealability.

Note that, as in the case of Embodiment 1 of the present invention, the clearance closing member 12 is separated off at a certain point in the circumferential direction thereof, and both the ends 12*a* and 12*b* of the clearance closing member 12 are held in a relatively displaceable state (see FIG. 6). Thus, the clearance closing member 12 is likely to be elastically deformed in the radial direction thereof and the circumferential direction thereof.

According to the throttle valve 20 of Embodiment 2 of the present invention, the valve body 21 is separated into the two separate valve bodies 22 and 23, so the mountability of the clearance closing member 12 can be enhanced. Thus, even if a continuous annular clearance closing member that is not separated off at any point is used instead of the aforementioned clearance closing member 12, which is separated off at one point in the circumferential direction thereof, the continuous annular clearance closing member can also be easily mounted to the valve body 21.

Figure 16:
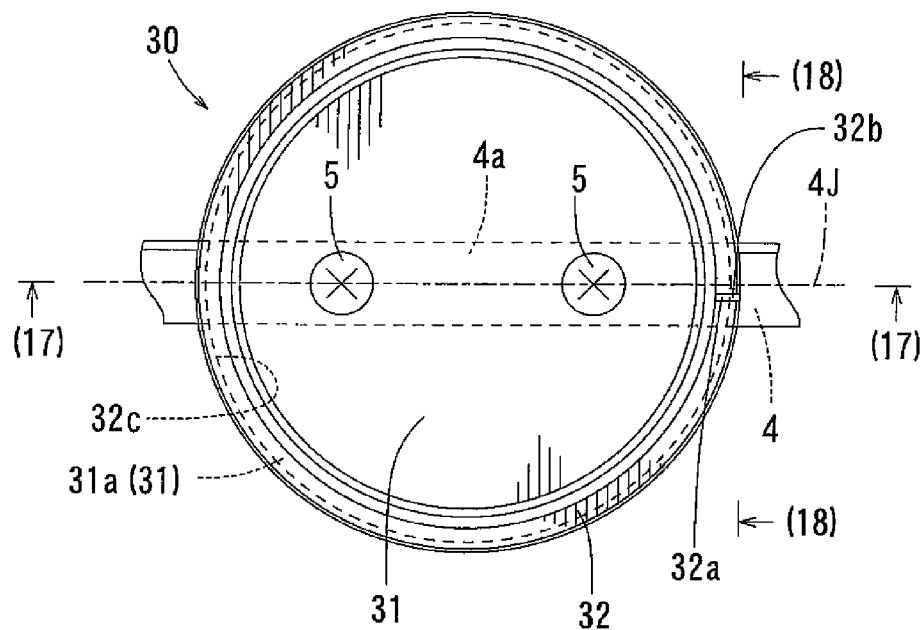
FIG. 16 is a plan view of a throttle valve according to Embodiment 3 of the present invention.
Figure 17:
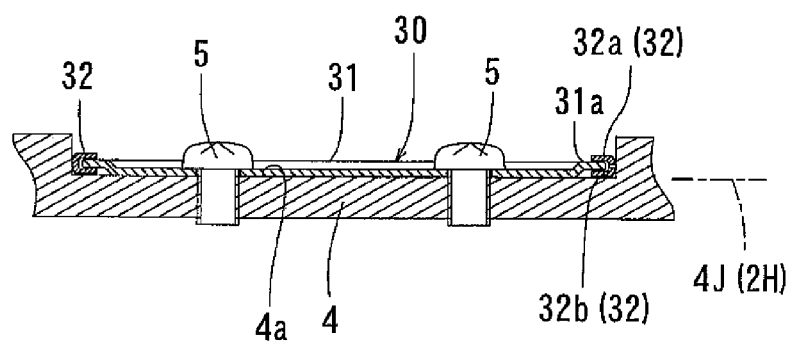
FIG. 17 is a sectional view on arrow taken along the line (17)-(17) of FIG. 16.
Figure 18:
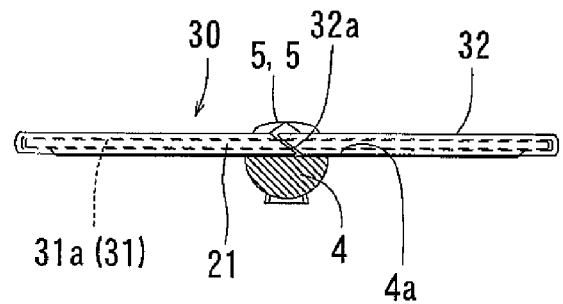
FIG. 18 is a sectional view on arrow taken along the line (18)-(18) of FIG. 16.

FIGS. 16 to 18 show a throttle valve 30 according to Embodiment 3 of the present invention. In the throttle valve 30 according to Embodiment 3 of the present invention, a clearance closing member 32 is fitted along a peripheral edge of a valve body 31. In this respect, the throttle valve 30 is identical to those of Embodiments 1 and 2 of the present invention. However, Embodiment 3 of the present invention is different from the foregoing Embodiment 2 of the present invention in that, on the contrary, a peripheral edge portion of the valve body 31 is inserted in a groove portion 32*c* provided in the clearance closing member 32 on an inner periphery side thereof. The same members and constructional details as in the foregoing embodiments of the present invention will be omitted.

In the case of the throttle valve 30 according to Embodiment 3 of the present invention, the valve body 31 is obtained by press-molding a single steel plate and bending a peripheral edge thereof into the shape of a crank along the entire circumference thereof. Thus, the valve body 31 has the same shape as the separate valve body 22 of the foregoing Embodiment 2 of the present invention. The valve body 31 is fixed to the flat surface 4*a* of the common turning shaft 4 by the screws 5 and 5.

Figure 19:
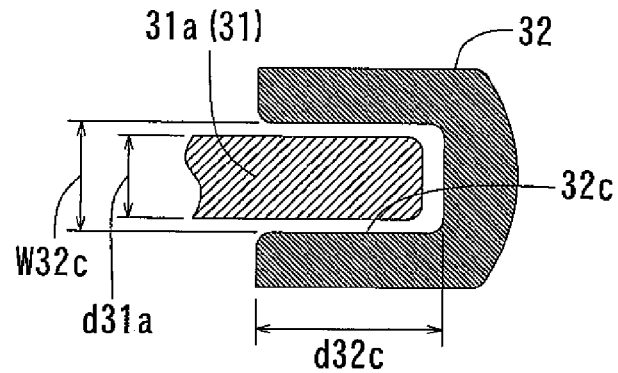
FIG. 19 is an enlarged view showing a longitudinal section of an end of the throttle valve.

A bent portion 31*a* formed in the shape of the crank on the peripheral edge of the valve body 31 is inserted in the groove portion 32*c* on the inner periphery side of the clearance closing member 32, so the clearance closing member 32 is fitted along the entire peripheral edge of the valve body 31. As shown in FIG. 19, in this Embodiment 3 of the present invention as well, a width W32*c* of the groove portion 32*c* of the clearance closing member 32 is formed to have a sufficiently large size with respect to a board thickness d31*a* of the bent portion 31*a*. A depth d32*c* of the groove portion 32*c* is set such that the clearance closing member 32 can be displaced radially within a certain range with respect to the valve body 31. Because of the foregoing construction, as in the cases of the foregoing Embodiments 1 and 2 of the present invention, the clearance closing member 32 of Embodiment 3 of the present invention is also supported in the floating state, that is, displaceably or elastically deformably with respect to the valve body 31 within a certain range in a radial direction and a board thickness direction thereof.

Further, the clearance closing member 32 is also separated off at one point in a circumferential direction thereof and hence has ends 32*a* and 32*b*. As shown in FIG. 18, both the ends 32*a* and 32*b* (reduced thickness portions) are also formed as inclined surfaces extending along a direction inclined with respect to an axis of the valve body 31. Therefore, both the ends 32*a* and 32*b* are likely to be displaced (elastically deformed) toward opposite sides in the board thickness direction while being in slidable contact with each other.

Figure 20:
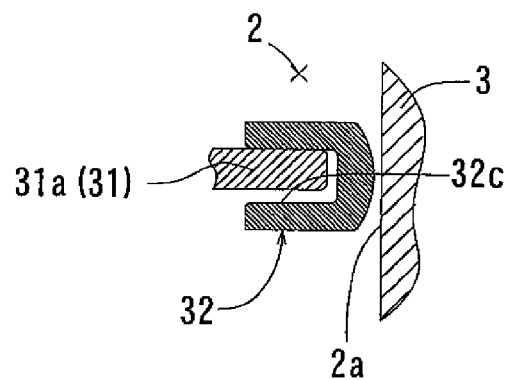
FIG. 20 is a longitudinal sectional view showing an end of a valve body according to Embodiment 3 of the present invention in a state in which a clearance closing member is displaced or elastically deformed within a groove portion. This figure illustrates a case where the clearance closing member is, partially along a circumferential direction thereof, out of contact with an inner wall surface of an intake passage.

According to the throttle valve 30 of Embodiment 3 of the present invention, which is constructed as described above, when the throttle valve 30 is at the closure position as shown in FIG. 20, a certain circumferential range of the clearance closing member 32 which is out of contact with the inner wall surface 2*a* of the intake passage 2 is elastically deformed downstream and parallel to the board thickness direction due to a negative pressure on the downstream side of the intake passage 2, so the bent portion 31*a* abuts against an upstream-side lateral wall of the groove portion 32*c*. As a result, the clearance between the clearance closing member 32 and the inner wall surface 2*a* of the intake passage 2 is narrowed.

Figure 21:
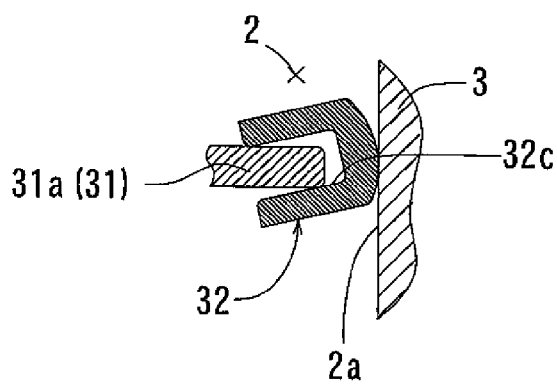
FIG. 21 is a longitudinal sectional view showing the end of the valve body according to Embodiment 3 of the present invention in a state in which the clearance closing member is displaced or elastically deformed within the groove portion. This figure illustrates a state in which the clearance closing member is twisted, partially along the circumferential direction thereof, in such a direction as to displace a bulge-out tip side thereof upstream.

Further, as shown in FIG. 21, in that range of the clearance closing member 32 which is brought into slidable contact with the inner wall surface 2*a* (of the intake passage 2) from the upstream side toward the downstream side in accordance with the closing movements of the throttle valve 30, the clearance closing member 32 is twisted counterclockwise as shown in FIG. 21 to be prevented from biting into the inner wall surface 2*a* of the intake passage 2.

Figure 22:
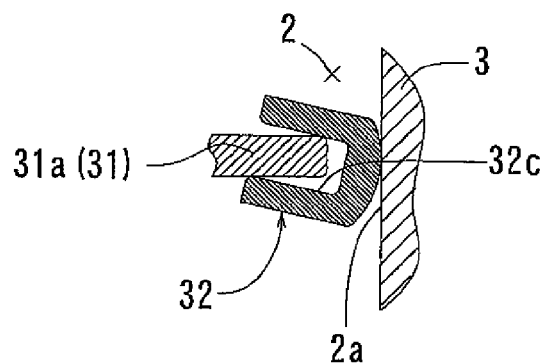
FIG. 22 is a longitudinal sectional view showing the end of the valve body according to Embodiment 3 of the present invention in a state in which the clearance closing member is displaced or elastically deformed within the groove portion. This figure illustrates a state in which the clearance closing member is twisted, partially along the circumferential direction thereof, in such a direction as to displace the bulge-out tip side thereof downstream.
Figure 23:
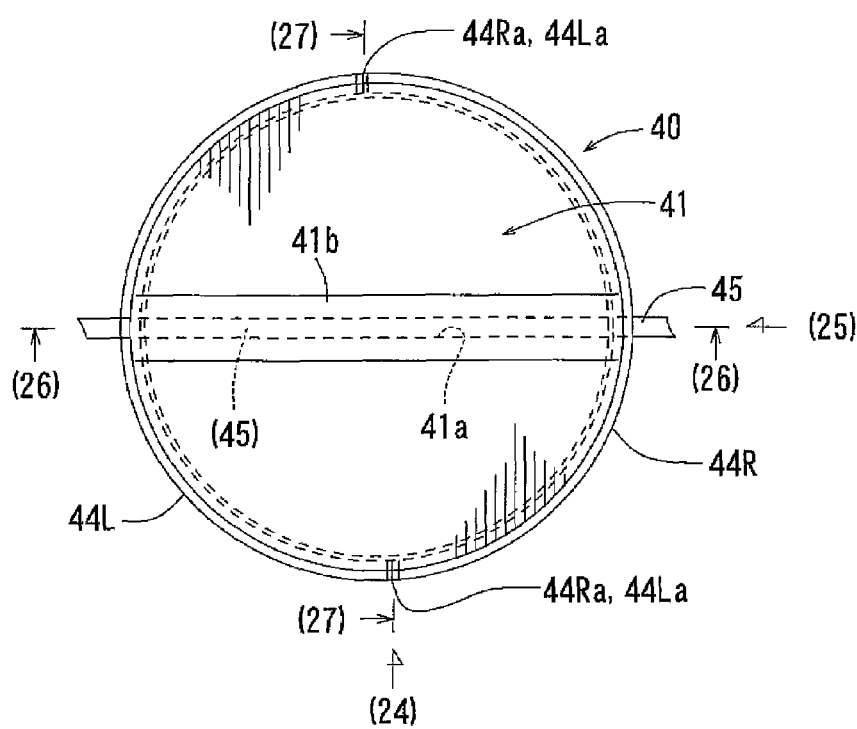
FIG. 23 is a plan view of a throttle valve according to Embodiment 4 of the present invention.

Furthermore, as shown in FIG. 22, in that range of the clearance closing member 32 which is brought into slidable contact with the inner wall surface 2*a* of the intake passage 2 from the downstream side toward the upstream side in accordance with the closing movements of throttle valve 30, the clearance closing member 32 is twisted clockwise as shown in FIG. 22 to be prevented from biting into the inner wall surface 2*a* of the intake passage 2.

In the case of Embodiment 3 of the present invention, since it is not necessary to provide any groove portion on the valve body 31 side. In consequence, the valve body 31 can be reduced in thickness (reduced in weight).

FIGS. 23 to 26 show a throttle valve 40 according to Embodiment 4 of the present invention. A mounting structure of the throttle valve 40 according to this Embodiment 4 of the present invention on a turning shaft 45 common to respective intake passages in a multi-arrayed variable intake valve device is different from that of Embodiment 1 of the present invention. This throttle valve 40 is also applied to each of a plurality of throttle valves in a multi-arrayed variable intake valve device. In this respect, Embodiment 4 of the present invention is identical to the foregoing respective embodiments of the present invention. Some of the constructional details of Embodiment 4 of the present invention are identical to those of Embodiment 1 of the present invention, so the description thereof will be omitted.

Figure 25:
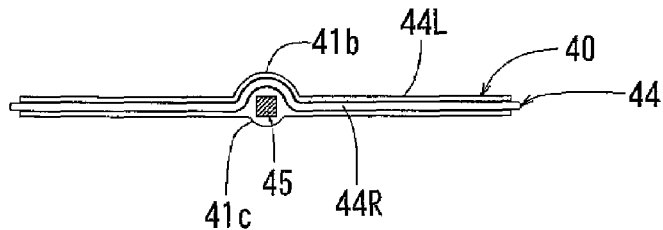
FIG. 25 is a lateral view of the throttle valve according to Embodiment 4 of the present invention as viewed from the direction of the arrow (25) of FIG. 23.
Figure 26:
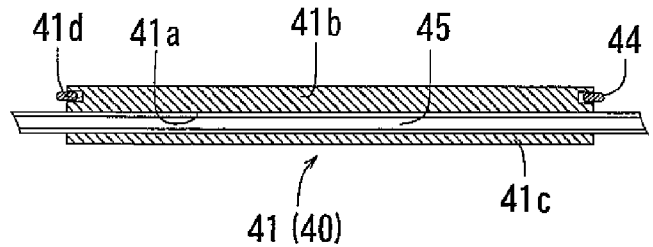
FIG. 26 is a sectional view of the throttle valve according to Embodiment 4 of the present invention taken along the line (26)-(26) of FIG. 23.
Figure 27:
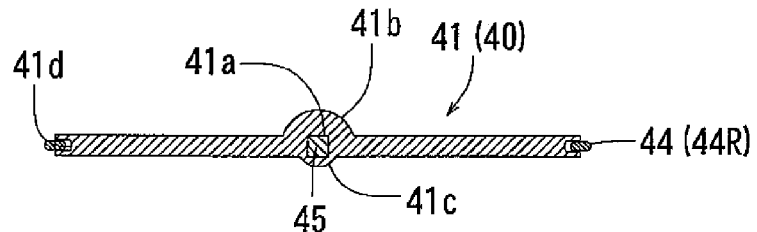
FIG. 27 is a sectional view on arrow of the throttle valve according to Embodiment 4 of the present invention taken along the line (27)-(27) of FIG. 23.

As shown in FIGS. 25 and 26, a valve body 41 of the throttle valve 40 of Embodiment 4 of the present invention has a support hole 41a through which the turning shaft 45 is inserted. A projection 41b having a semicircular configuration (in cross-section) is formed at the center of an upper surface of the valve body 41 (a surface located on the upstream side with respect to the flow of inflow air). Further, a projection 41c that is semicircular in cross-section and smaller in cross-sectional area than the projection 41b is formed at the center of a lower surface of the valve body 41 (a surface located on the downstream side with respect to the flow of inflow air). Both the projections 41b and 41c are formed along a common axis (diameter) in a surface direction stretching through the center of the valve body 41. A support hole 41a that is rectangular in cross-section is formed between both the projections 41b and 41c. A central axis of the support hole 41a coincides with the center of the valve body 41 in a board thickness direction.

The turning shaft 45, which is inserted through the support hole 41a, has a rectangular cross-section (a rectangular turning shaft) so that the turning shaft 45 can be inserted through the support hole 41a without jouncing. Because this rectangular turning shaft 45 is inserted through the support hole 41a, the valve body 41 and hence the throttle valve 40 are designed to rotate integrally with the turning shaft 45 around an axis thereof. Accordingly, in the case of Embodiment 4 of the present invention, the fixing screws 5 for fixing the throttle valve 40 to the turning shaft 45 are not required, unlike the cases of Embodiments 1 to 3 of the present invention. Since it is not necessary to perform the fastening operation by using the fixing screws 5 and 5, so the number of parts and the man-hours for mounting can be reduced. As a result, the cost of the throttle valve 40 can be reduced.

Figure 24:
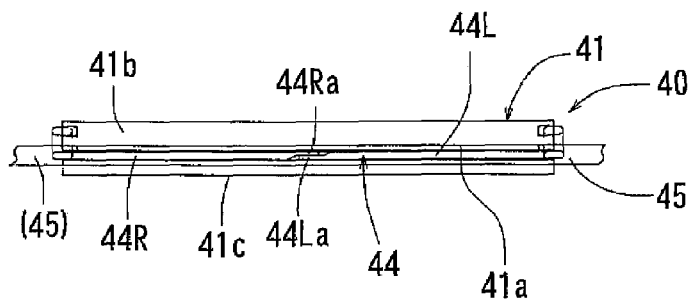
FIG. 24 is a lateral view of the throttle valve according to Embodiment 4 of the present invention as viewed from the direction of the arrow (24) of FIG. 23.

A clearance closing member 44 is fitted along an entire peripheral edge of the valve body 41. This clearance closing member 44 is separated into a separate piece 44R fitted along a right half of the circumference of the valve body 41 and a separate piece 44L fitted along a left half of the circumference of the valve body 41 in FIG. 23. Both the separate pieces 44R and 44L are each held within a groove portion 41d provided along a peripheral surface of the valve body 41. As shown in FIG. 24, ends 44Ra and 44La of both the separate pieces 44R and 44L are reduced in thickness and opposed to each other in a relatively displaceable state as in the case of Embodiment 1 of the present invention. In Embodiment 4 of the present invention, as described above, the clearance closing member 44 is separated into the two separate pieces 44R and 44L in the circumferential direction thereof, so both the separate pieces 44R and 44L and hence the clearance closing member 44 are likely to be displaced and elastically deformed more smoothly.

In this Embodiment 4 of the present invention, a part of a groove portion 41d corresponding to both lateral surfaces of the protrusion 41b is formed along a semi-circular curve to correspond to the semicircular curve to correspond to the semicircular shape of each protrusions 41b in a cross section. Accordingly, as shown in FIG. 25, the clearance closing member 44 held within the groove portion 41d is also fitted, over the range corresponding to both the lateral surfaces of the projection 41b on the upper surface side, along a route curved in the shape of a semicircle. Thus, the clearance closing member 44, which is fitted along the center of the valve body 41 in the board thickness direction thereof as with the turning shaft 45, is fitted continuously over the entire circumference of the valve body 41 while circumventing the turning shaft 45. Thus, the clearance closing member 44 is held in slidable contact with the inner wall surface 2a of the intake passage 2 around the turning shaft 45 as well, so the throttle valve 40 is ensured of higher sealability around the turning shaft 45.

According to the throttle valve 40 of Embodiment 4 of the present invention, as in the case of Embodiment 1 of the present invention, the clearance closing member 44 is fitted along the entire peripheral edge of the valve body 41 in the floating state, in a displaceable and elastically deformable state, within a certain range in a radial direction and a board thickness direction of the valve body 41. Therefore, when the clearance closing member 44 is displaced or elastically deformed, partially in the circumferential direction thereof, in an appropriate direction with respect to the circumferential direction, as shown in FIGS. 7 to 9, the sealability of each of throttle valves 40 can thereby be made higher than before regardless of dispersion of the mounting positions (mounting angles) of the respective throttle valves 40 on the turning shaft 45, while the clearance closing member 44 can be prevented from biting into the inner wall surface 2a of the intake passage 2.

The clearance closing member 44 is separated into the two separate pieces 44R and 44L, so the mountability of the clearance closing member 44 on the valve body 41 can be enhanced.

Figure 28:
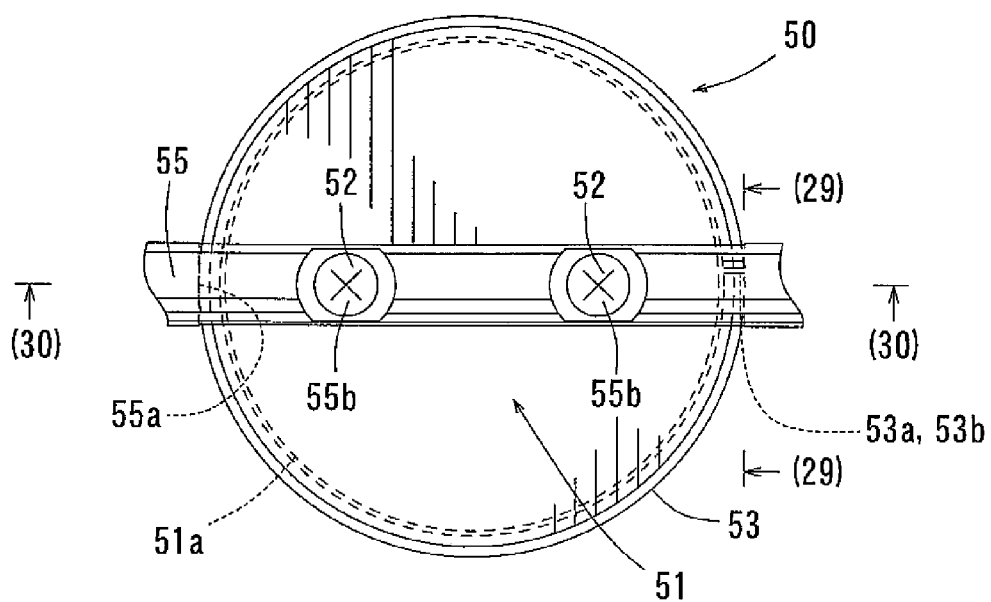
FIG. 28 is a plan view of a throttle valve according to Embodiment 5 of the present invention.
Figure 29:
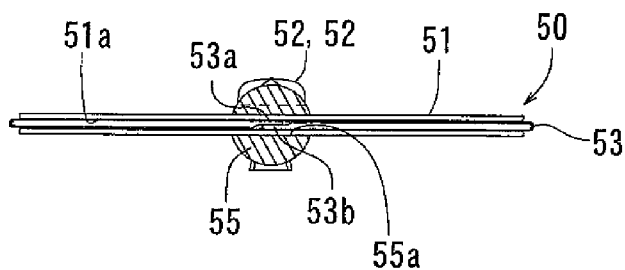
FIG. 29 is a lateral view of the throttle valve according to Embodiment 5 of the present invention as a view on arrow taken along the line (29)-(29) of FIG. 28.
Figure 30:
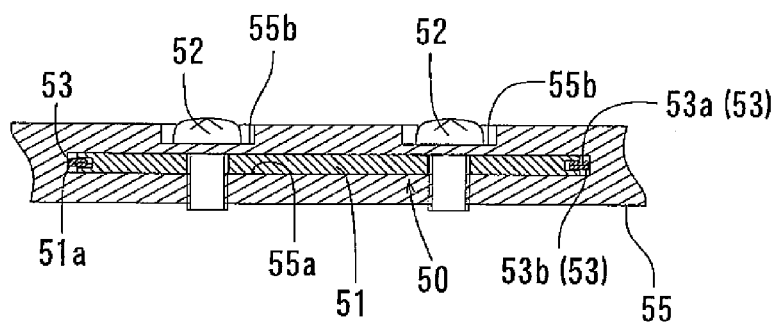
FIG. 30 is a longitudinal sectional view of the throttle valve according to Embodiment 5 of the present invention as a sectional view on arrow taken along the line (30)-(30) of FIG. 28.

FIGS. 28 and 29 show a throttle valve 50 according to Embodiment 5 of the present invention. This Embodiment 5 of the present invention is also different in the mounting structure of a turning shaft 55 that is common to respective intake passages in a variable intake valve device. Some of the constructional details of Embodiment 5 of the present invention are identical to those of Embodiment 1 of the present invention, so the description thereof will be omitted.

In the case of this Embodiment 5 of the present invention, a groove portion 55a is formed in the turning shaft 55, which is circular in cross-section, along a central axis thereof. This groove portion 55a is formed in the shape of an elongated slit in a lateral view, in accordance with a board thickness and a diameter of the throttle valve 50. The groove portion 55a is formed along the central axis of the turning shaft 55. The throttle valve 50 is inserted in the groove portion 55a without jouncing in a board thickness direction and a radial direction thereof. The throttle valve 50 inserted in the groove portion 55a is fastened by fixing screws 52 and 52 to be prevented from shifting in position. Both the fixing screws 52 and 52 are fastened with head portions thereof abutting against counter sunk portions 55b and 55b formed in the turning shaft 55, respectively.

As in the case of Embodiment 1 of the present invention, a groove portion 51a is formed along an entire peripheral edge of the valve body 51, and a clearance closing member 53 is fitted within the groove portion 51a such that an inner periphery side of the clearance closing member 53 is inserted in the groove portion 51a. This clearance closing member 53 is also separated off at one point in a circumferential direction thereof. Both ends 53a and 53b formed through the separation are reduced in thickness and opposed to each other in a relatively displaceable state, as with both the ends 12a and 12b of the foregoing Embodiment 1 of the present invention. As shown in FIG. 28, opposed portions of both those ends 53a and 53b are located within the groove portion 55a of the turning shaft 55. Thus, the opposed portions of both the ends 53a and 53b (a clearance) are shielded by the turning shaft 55, so the leakage of inflow air in this region is prevented.

In this Embodiment 5 of the present invention as well as in the case of the foregoing Embodiment 1 of the present invention, the clearance closing member 53 is fitted in the floating state along the peripheral edge of the valve body 51. Therefore, when the clearance closing member 53 is displaced or elastically deformed, partially in the circumferential direction thereof, in an appropriate direction with respect to the inner wall surface 2a of the intake passage 2, the sealability of the clearance closing member 53 can thereby be enhanced while the clearance closing member 53 can be prevented from biting into the inner wall surface 2a of the intake passage 2. Accordingly, even in a case where a mounting error is generated in each of a plurality of throttle valves 50 in a variable intake valve device equipped with the throttle valves 50, the leakage amount of inflow air reduced in a closing position.

According to Embodiments 1 to 5 of the present invention, the valve bodies 11, 21, 31, 41, and 51 of the respective throttle valves 10 to 50 are circular in shape. However, as will be described below, the present invention is also applicable in the same manner to a case where a valve body is oblong in shape.

FIGS. 31 to 35 each show a throttle valve 60 according to Embodiment 6 of the present invention as an example. The throttle valve 60 according to this Embodiment 6 of the present invention has an oblong valve body 61, and a clearance closing member 65 fitted along a peripheral edge thereof.

Figure 34:
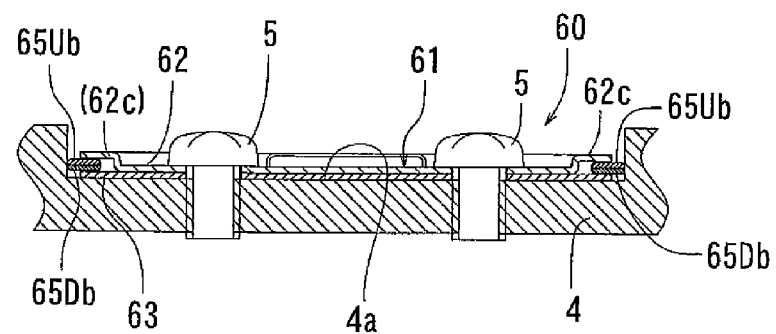
FIG. 34 is a sectional view on arrow taken along the line (34)-(34) of FIG. 31.
Figure 35:
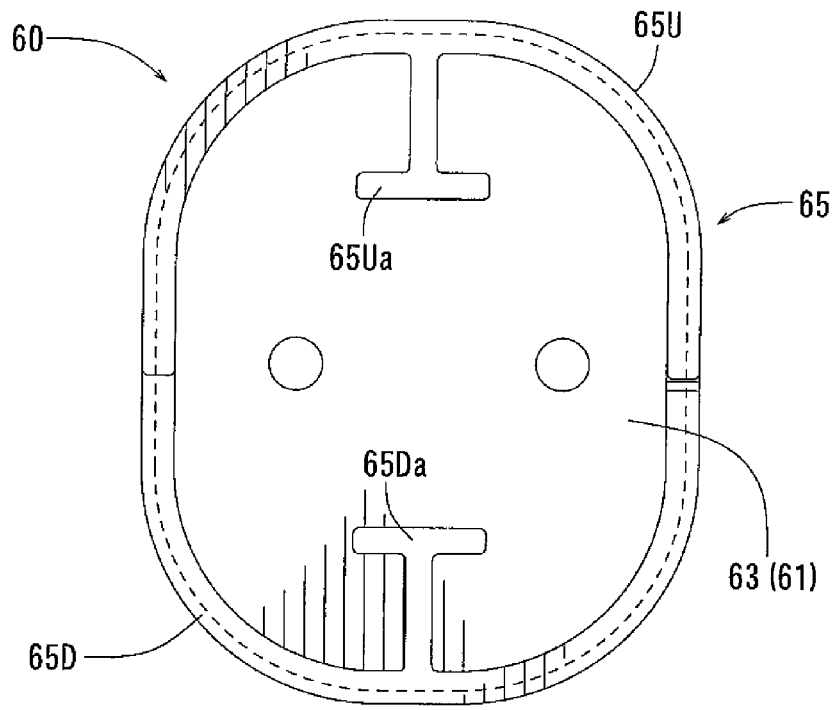
FIG. 35 is a sectional view on arrow taken along the line (35)-(35) of FIG. 32.

As in the case of Embodiment 2 of the present invention, the valve body 61 has a two-body structure in which two separate valve bodies 62 and 63 are superposed on each other to be coupled together. Both the separate valve bodies 62 and 63 are fixed in a superposed state to the flat surface 4a of the turning shaft 4 by the fixing screws 5 and 5. Referring to FIG. 34, a peripheral edge of the separate valve body 62, which is located on an upper side (an upstream side), is bent upstream in the shape of a crank. A groove portion 61a for fitting the clearance closing member 65 is formed between a bent portion 62c and a peripheral edge of the separate valve body 63, which is located on a lower side (a downstream side) in the figures. As in the cases of the foregoing respective embodiments of the present invention, the width and the depth of this groove portion 61a are appropriately set such that the clearance closing member 65 has a floating structure, in which the clearance closing member 65 can be displaceable (elastically deformable) within a certain range in a radial direction thereof, a board thickness direction thereof, and a direction inclined with respect to the board thickness direction.

T-shaped holding recess portions 66 and 67 for holding the clearance closing member 65 are provided between both the separate valve bodies 62 and 63. That is, projections 62a and 62b swelling upstream in the shape of T are provided to both sides of the separate valve body 62 on the upstream side with respect to the turning shaft 4, in other words, to both lateral portions of the separate valve body 62 on a turning tip side thereof. The upper separate valve body 62 and the lower separate valve body 63 are superposed on each other, so the holding recess portion 66 is formed between the projection 62a and the separate valve body 63 on the downstream side, and the holding recess portion 67 is formed between the projection 62b and the separate valve body 63 on the downstream side.

Figure 31:
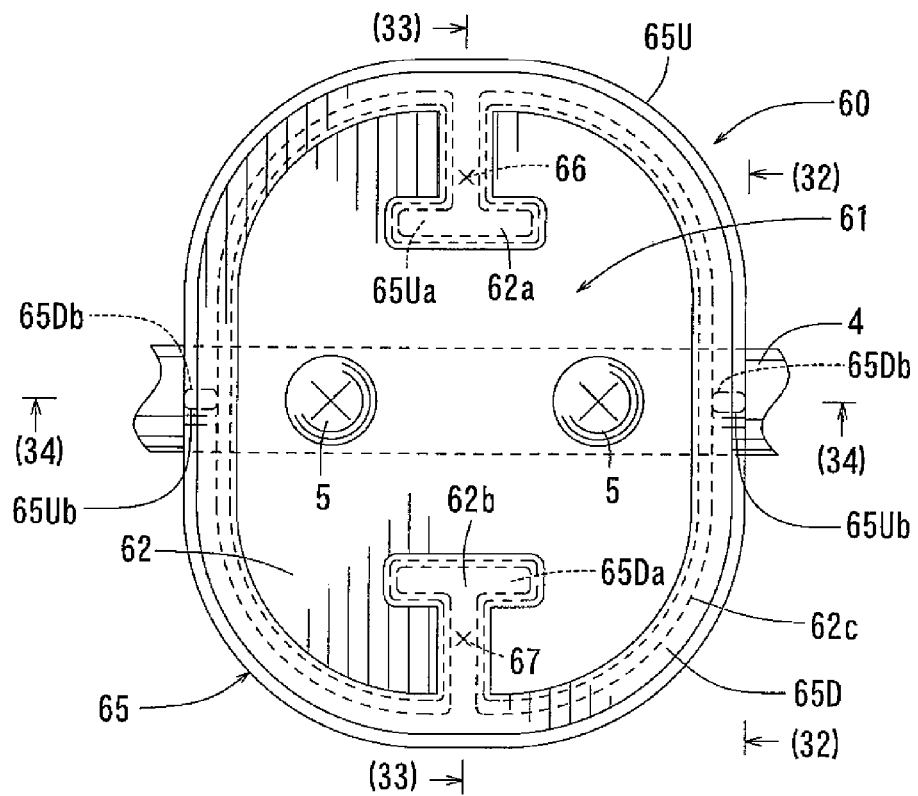
FIG. 31 is a plan view of a throttle valve according to Embodiment 6 of the present invention.
Figure 32:
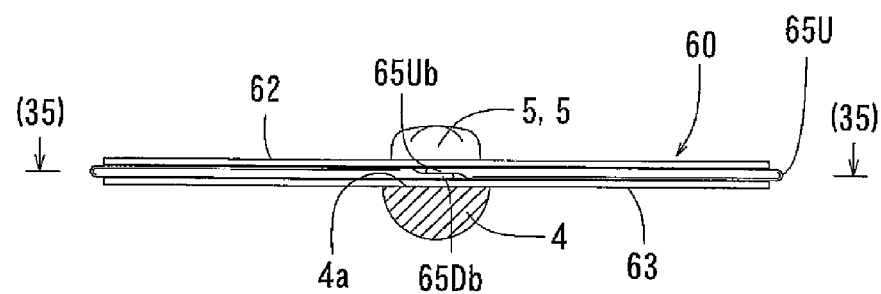
FIG. 32 is a view on arrow of the throttle valve according to Embodiment 6 of the present invention taken along the line (32)-(32) of FIG. 31.
Figure 33:
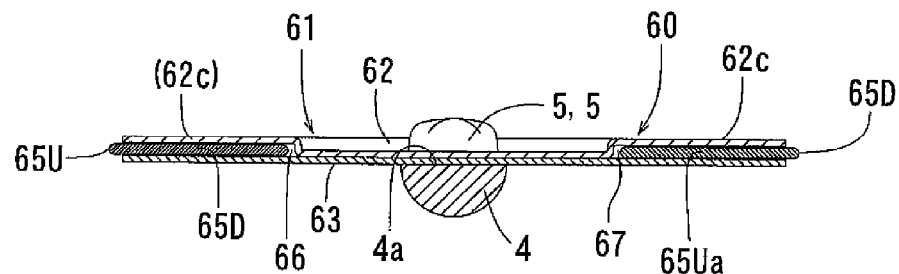
FIG. 33 is a sectional view on arrow taken along the line (33)-(33) of FIG. 31.

Then, referring to FIG. 31, the clearance closing member 65 is separated into two pieces of an upper separate piece 65U and a lower separate piece 65D. Both the separate pieces 65U and 65D have a generally U-shaped configuration. As in the cases of the foregoing respective embodiments of the present invention, both ends 65Ub and 65Db of both the respective separate pieces 65U and 65D are reduced in thickness. The end 65Ub of the separate piece 65U and the end 65Db of the separate piece 65D are opposed to each other in a relatively displaceable state. Holding arm portions 65Ua and 65Da, which bulge out in the shape of T toward inner periphery sides of both the separate pieces 65U and 65D respectively, are formed at longitudinal centers thereof respectively. With those holding arm portions 65Ua and 65Da accommodated within the holding recess portions 66 and 67 respectively, both the separate pieces 65U and 65D are fitted along a range corresponding to half of a circumference of the groove portion 61a. The depths and the widths of the holding recess portions 66 and 67 are appropriately set such that both the holding arm portions 65Ua and 65Da can be displaced within a certain range in a surface direction of the valve body 61, a board thickness direction of the valve body 61, and a direction inclined with respect to the board thickness direction of the valve body 61 within the holding recess portions 66 and 67, respectively.

As described above, according to the throttle valve 60 of Embodiment 6 of the present invention as well, the clearance closing member 65 is provided so as to be displaceable and elastically deformable (according to the floating structure) within a certain range with respect to the valve body 61 in the surface direction, the board thickness direction thereof, and the direction inclined with respect to the board thickness direction thereof. Therefore, as in the cases of the foregoing respective embodiments of the present invention, while the clearance closing member 65 can be prevented from biting into the inner wall surface 2a of the intake passage 2, the clearance between the clearance closing member 65 and the inner wall surface 2a of the intake passage 2 can be set to be smaller than before to thereby reduce the leakage amount of inflow air. According to this construction, when the closure positions of throttle valves 60 in the respective intake passages 2 of the variable intake valve device disperse, the leakage amount of inflow air at the time when each of the throttle valves 60 is at the closure position can be made smaller than before to improve the outputting performance of the engine.

Further, in the case of Embodiment 6 of the present invention, the clearance closing member 65 is separated into the two pieces along the circumference of the valve body 61, and the respective pieces are likely to be displaced and elastically deformed individually. Thus, the follow-up properties of the clearance closing member 65 with respect to the inner wall surface 2a of the intake passage 2 can be enhanced to make it easy for the clearance closing member 65 to, so to speak, fit in with the inner wall surface 2a of the intake passage 2.

Besides, in the case of the construction of Embodiment 6 of the present invention, the holding arm portions 65Ua and 65Da, which are provided to the longitudinal centers of both the separate pieces 65U and 65D of the clearance closing member 65 respectively, prevent both the separate pieces 65U and 65D from dropping out from the valve body 61 respectively. Therefore, the amounts of displacement or elastic deformation of both the separate pieces 65U and 65D in the surface direction of the valve body 61 (a direction extending along the sheet of FIG. 31) can be set larger on the ends 65Ub and 65Db sides thereof than on central portion sides thereof so as to improve the mobility of both the separate pieces 65U and 65D. According to this construction, the sliding resistance of the clearance closing member 65 (the separate pieces 65U and 65D) with respect to the inner wall surface 2a of the intake passage 2 can be reduced when the throttle valve 60 is opened/closed. In consequence, the operation resistance of the throttle valve 60 can be reduced.

Further, in the construction of Embodiment 6 of the present invention, the valve body 61 is separated into the two separate valve bodies 62 and 63, and the clearance closing member 65 is interposed between both the separate valve bodies 62 and 63. Therefore, even in a case where both the separate pieces 65U and 65D of the clearance closing member 65 assume a relatively complicated shape by, for example, having the T-shaped holding arm portions 65Ua and 65Da as mentioned in the foregoing example, the mountability of the clearance closing member 65 on the valve body 61 can be ensured with ease. Thus, in setting means of preventing both the separate pieces 65U and 65D from dropping out from the valve body 61 (the groove portion 61a), the range of choice thereof (the degree of freedom in selecting such means) is widened (increased).

The foregoing Embodiment 6 of the present invention can further be modified. FIGS. 36 to 40 show a throttle valve 70 according to Embodiment 7 of the present invention. This throttle valve 70 according to Embodiment 7 of the present invention has a valve body 71, formed to have an oblong shape as with the valve body 61 of Embodiment 6 of the present invention, and a clearance closing member 72 fitted along a peripheral edge of the valve body 71.

In the case of Embodiment 7 of the present invention, the valve body 71 is manufactured as an integrally molded piece made of resin, unlike the case of Embodiment 6 of the present invention. A groove portion 71a is formed on a peripheral edge of this valve body 71 along an entire circumference thereof. An inner periphery side of the clearance closing member 72 is inserted in this groove portion 71a, so the clearance closing member 72 is fitted along the peripheral edge of the valve body 71. The valve body 71 is fixed on the flat surface 4a of the turning shaft 4 common to the respective intake passages 2 to 2 in the variable intake valve device by the fixing screws 5 and 5, as in the cases of the foregoing respective embodiments of the present invention.

Figure 36:
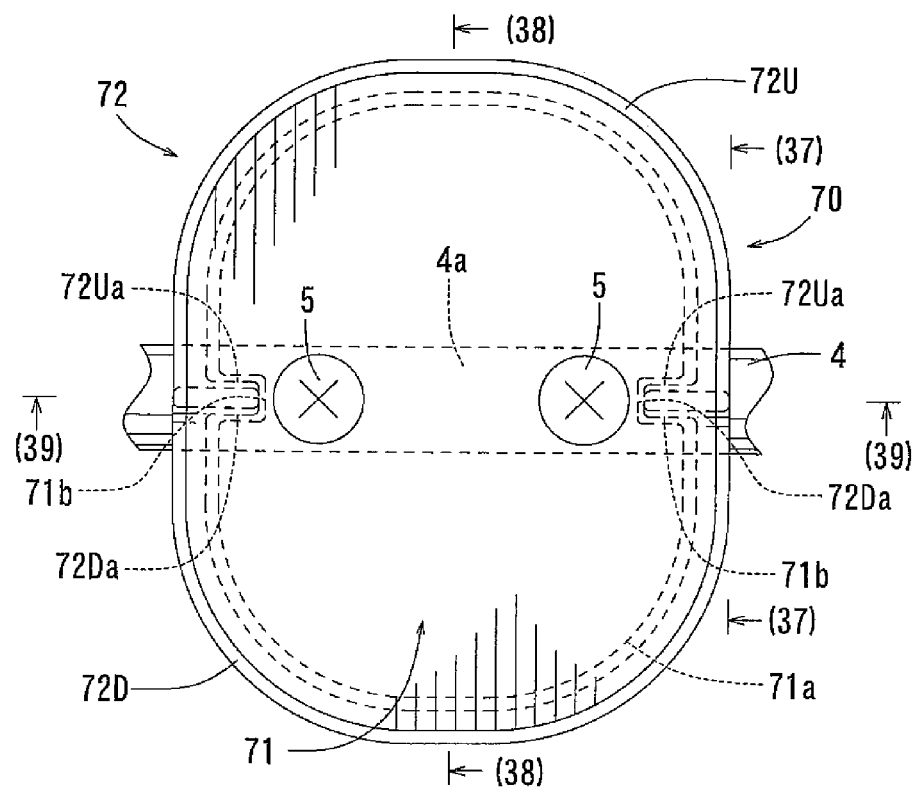
FIG. 36 is a plan view of a throttle valve according to Embodiment 7 of the present invention.
Figure 37:
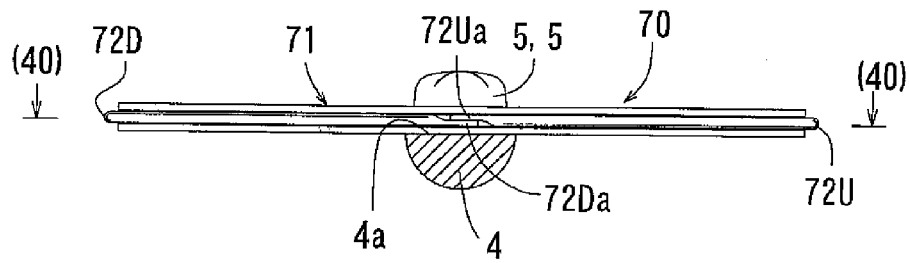
FIG. 37 is a view on arrow of the throttle valve according to Embodiment 7 of the present invention taken along the line (37)-(37) of FIG. 36.
Figure 38:
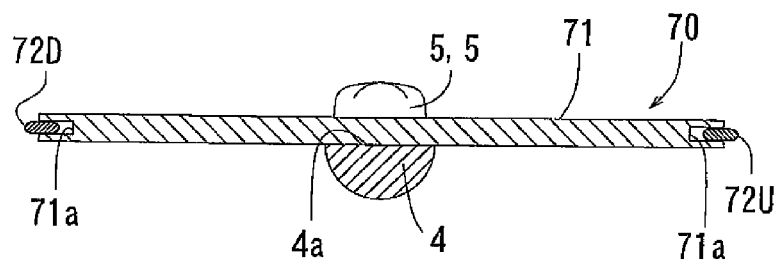
FIG. 38 is a sectional view on arrow taken along the line (38)-(38) of FIG. 36.
Figure 39:
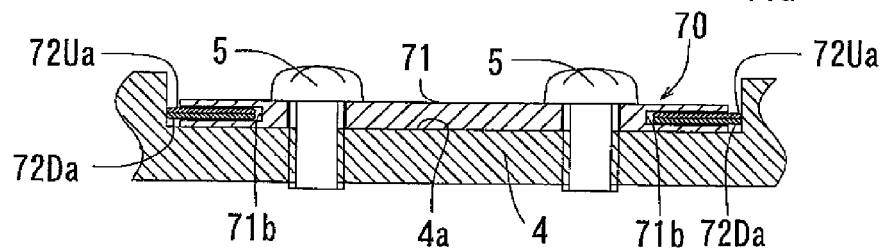
FIG. 39 is a sectional view on arrow taken along the line (39)-(39) of FIG. 36.

The groove portion 71a is not equal in depth along the entire circumference of the valve body 71. As shown in FIGS. 36 and 39, the groove portion 71a is formed deeply with a certain depth in the direction of the axis of the turning shaft 4 at two points corresponding to longitudinal centers of the valve body 71. Those deepened portions of the groove portion 71a will be referred to hereinafter as holding recess portions 71b and 71b formed in the groove portion 71a.

On the other hand, referring to FIG. 36, the clearance closing member 72 is separated into two pieces of an upper separate piece 72U and a lower separate piece 72D, each of which has a generally U-shaped configuration. In this respect, Embodiment 7 of the present invention is identical to Embodiment 6 of the present invention. However, this Embodiment 7 of the present invention is different from Embodiment 6 of the present invention in that the separate piece 72U has holding arm portions 72Ua at both ends thereof respectively and that the separate piece 72D has holding arm portions 72Da at both ends thereof respectively.

Figure 41:
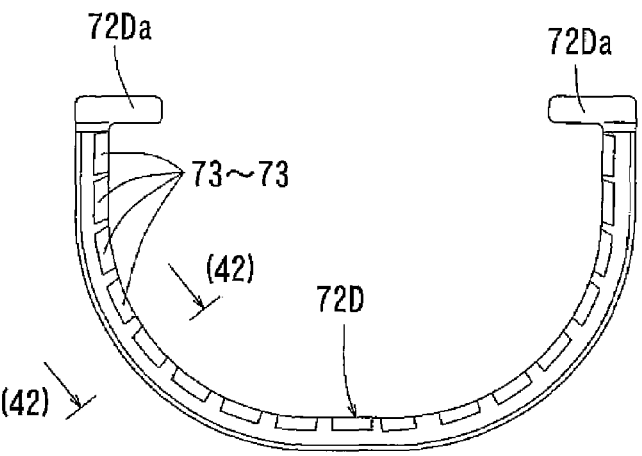
FIG. 41 is a plan view of one of separate pieces of a clearance closing member according to Embodiment 7 of the present invention.

Both the ends of each of both the separate pieces 72U and 72D are reduced in thickness as in the cases of the foregoing respective embodiments of the present invention. The ends (reduced thickness portions) of the separate piece 72U and the ends (reduced thickness portions) of the separate piece 72D are each opposed to each other in a relatively displaceable state. In Embodiment 7 of the present invention, those reduced thickness portions further bulge out toward an inner periphery side (in the shape of L). In the following description, those reduced-thickness L-shaped bent portions correspond to the holding arm portions 72Ua and 72Da, respectively. FIG. 41 shows one of the separate pieces 72D independently. The other separate piece 72U is also constructed in the same manner.

Both the holding arm portions 72Da and 72Da of the separate piece 72D are opposed to the holding arm portions 72Ua of the separate piece 72U respectively in a relatively displaceable state. In this opposed state, the holding arm portions 72Da and the holding arm portions 72Ua are inserted in the holding recess portion 71b of the groove portion 71a of the valve body 71, respectively. Both the separate pieces 72U and 72D can be fitted along the groove portion 71a by, for example, elastically deforming both the ends of each of the separate pieces 72U and 72D (the holding arm portions 72Ua and 72Da) oppositely in a board thickness direction.

When both the separate pieces 72U and 72D fitted in the groove portion 71a as described above, both the separate pieces 72U and 72D are displaceable and elastically deformable independently of each other in a surface direction of the valve body 71, a board thickness direction of the valve body 71, and a direction inclined with respect to the board thickness direction of the valve body 71, and the widths, the depths, and the like of the groove portion 71a and the holding recess portion 71b are appropriately set such that sufficient displacement amounts of the separate pieces 72U and 72D are ensured.

Figure 40:
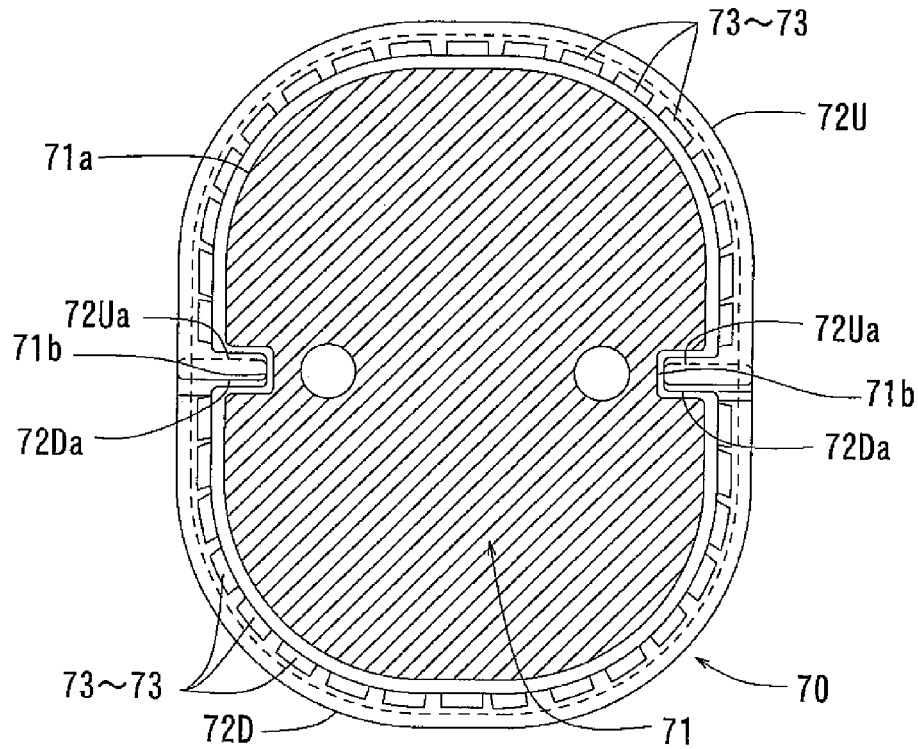
FIG. 40 is a sectional view on arrow taken along the line (40)-(40) of FIG. 37.
Figure 42:
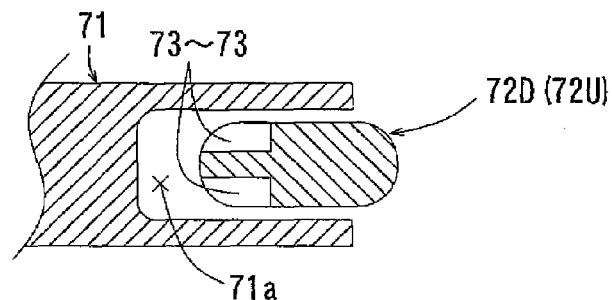
FIG. 42 is a longitudinal sectional view of a recess portion for accumulating dust as a sectional view on arrow taken along the line (42)-(42) of FIG. 41.

As shown in FIGS. 40 to 42, a large number of recess portions 73 to 73 are provided to an inner periphery side of each of both the separate pieces 72U and 72D, in both surfaces of each of both the separate pieces 72U and 72D in a board thickness direction thereof. Dust particles contained in blow-by gas, oil mist, and the like and other dust particles (so-called deposits), which have entered the groove portion 71a of the valve body 71, are scraped by or accumulated within the recess portions 73 to 73, so those dust particles can be prevented from adhering to or breaking into a contact surface between the groove portion 71a and the clearance closing member 72. Thus, the clearance closing member 72 can be prevented from failing to operate properly, so the durability of the throttle valve 70 can be enhanced.

Further, by providing the above-mentioned recess portions 73 to 73, an area of contact of the clearance closing member 72 with the groove portion 71a can be reduced to lessen the operation resistance of the clearance closing member 72 in the groove portion 71a. Therefore, the clearance closing member 72 can be ensured for smooth operation. Further, the recess portions 73 to 73 can likely make the clearance closing member 72 elastically deformed. In this respect as well, the sealability of the clearance closing member 72 against the inner wall surface 2a of the intake passage 2 (the ease of which the clearance closing member 72 fits in with the inner wall surface 2a of the intake passage 2) and the function of preventing the clearance closing member 72 from biting into the inner wall surface 2a of the intake passage 2 can be enhanced.

Furthermore, as in the cases of the foregoing respective embodiments of the present invention, each of both the separate pieces 72U and 72D is formed on an outer periphery side thereof into the shape of a semicircle in cross-section, so both the separate pieces 72U and 72D are unlikely to bite into the inner wall surface 2a of the intake passage 2. In this respect, Embodiment 7 of the present invention is identical to the foregoing respective embodiments of the present invention.

According to the throttle valve 70 of Embodiment 7 of the present invention constructed as described above, the clearance closing member 72 is fitted along the peripheral edge of the valve body 71. This clearance closing member 72 is provided so as to be partially or entirely displaceable and elastically deformable (according to the floating structure) within a certain range with respect to the valve body 71 in the surface direction, the board thickness direction, and the direction inclined with respect to the board thickness direction of the valve body 71. Thus, while the clearance closing member 72 can be prevented from biting into the inner wall surface 2a of the intake passage 2, the clearance between the clearance closing member 72 and the inner wall surface 2a of the intake passage 2 can be closed or made small to make the leakage amount of inflow air smaller than before. According to this construction, even if the closure positions of respective throttle valves 70 disperse in a multi-arrayed variable intake valve device, the leakage amount of air flowing into each of the intake passages 2 can be made smaller than before to thereby provide an engine with high outputting performance.

Further, in the case of the throttle valve 70 according to Embodiment 7 of the present invention, the clearance closing member 72 is separated into the two separate pieces 72U and 72D along the peripheral edge of the valve body 71. Therefore, the clearance closing member 72 can be smoothly displaced and elastically deformed within the groove portion 71a and hence made likely to fit in with the inner wall surface 2a of the intake passage 2. In addition, both the ends of each of both the separate pieces 72U and 72D (the holding arm portions 72Ua and 72Da) are reduced in thickness and abutted against each other in a relatively displaceable state. Therefore, while the leakage of inflow air in this butted region is prevented, both the separate pieces 72U and 72D are displaced and elastically deformed more smoothly.

Figure 52:
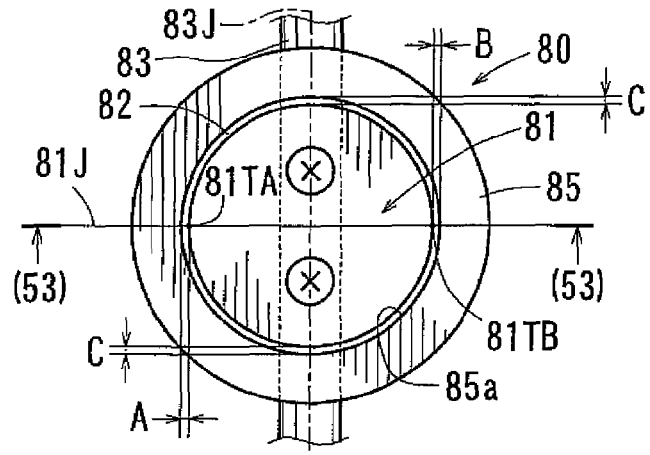
FIG. 52 is a plan view of a throttle valve according to Embodiment 8 of the present invention and an intake passage.
Figure 53:
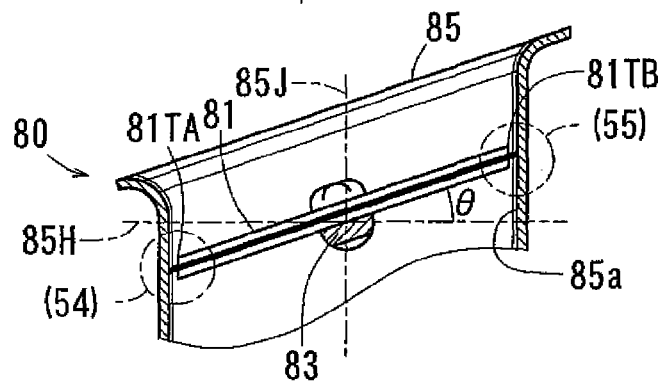
FIG. 53 is a longitudinal sectional view of the throttle valve according to Embodiment 8 of the present invention and the intake passage as a sectional view taken along the line (53)-(53) of FIG. 52.

FIGS. 52 and 53 show a throttle valve 80 according to Embodiment 8 of the present invention.

The throttle valve 80 of Embodiment 8 of the present invention is identical to that of Embodiment 1 of the present invention in that a clearance closing member 82 is fitted along an entire circumference of a peripheral edge of a valve body 81 that is generally circular in shape (not exactly circular in shape) and that the valve body 81 is fixed to a single turning shaft 83 rotatably supported by the body 3. The throttle valve 80 of Embodiment 8 of the present invention is also identical to that of Embodiment 1 of the present invention in that the clearance closing member 82 is inserted on an inner periphery side thereof in a groove portion 81b formed in the shape of a semicircle in cross-section and provided along a peripheral edge surface 81a of the valve body 81, and that the clearance closing member 82 is also formed on an outer periphery side thereof in the shape of a semicircle in cross-section and brought into slidable contact with an inner wall surface 85a of an intake passage 85 mainly during full closure of the throttle valve 80.

The throttle valve 80 of Embodiment 8 of the present invention is different from that of Embodiment 1 of the present invention in that the full-closure position of the valve body 81 is set such that the valve body 81 is inclined with respect to a horizontal axis 85H of the intake passage 85 (an axis perpendicular to an axis 85J of the intake passage 85). As shown in FIG. 52, the full-closure position of the valve body 81 is set such that the valve body 81 is inclined counterclockwise in the figure with respect to the horizontal axis 85H by an angle θ.

Figure 54:
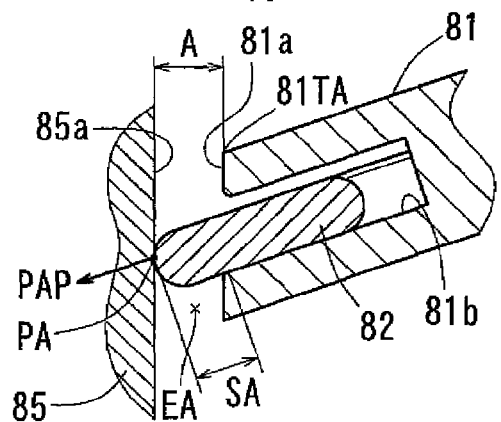
FIG. 54 is an enlarged view of the region (54) of FIG. 53.
Figure 55:
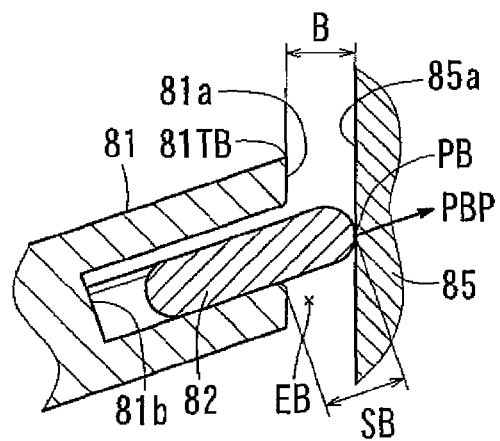
FIG. 55 is an enlarged view of the region (55) of FIG. 53.

FIG. 54 shows a downstream-side end TA of the valve body 81 at the time when the valve body 81 is at the full-closure position, and FIG. 55 shows an upstream-side end TB of the valve body 81 at when the valve body 81 is also at the full-closure position. As shown in FIGS. 54 and 55, the peripheral edge surface 81a of the valve body 81 is so formed as to extend parallel to the inner wall surface 85a of the intake passage 85 when the valve body 81 is at the full-closure position. Therefore, the peripheral edge surface 81a of the valve body 81 is inclined, at and around the upstream-side end TB and at and around the downstream-side end TA, with respect to a surface direction (an upper surface and a lower surface) of the valve body 81. The direction of inclination of the peripheral edge surface 81a of the valve body 81 on the upstream-side end TB side is opposite to the direction of inclination of the peripheral edge surface 81a of the valve body 81 on the downstream-side end TA side. The angle of inclination of the peripheral edge surface 81a with respect to each of the upper surface and the lower surface of the valve body 81 changes continuously in the circumferential direction thereof and is maximized at the downstream-side end TA and the upstream-side end TB.

Note that as shown in FIG. 52, among those two ends on the peripheral edge of the valve body 81 which are located on an axis 81J perpendicular to the turning shaft 83 in a plan view, an end located on the downstream side of inflow air (in the lower part of FIG. 53) is referred to as downstream-side end 81TA, and the other end located on the upstream side (in the upper part of FIG. 53) is referred to as upstream-side end 81TB.

A range located downstream for an axis 83J of the turning shaft 83 (a range on the left side of FIG. 52) is referred to as downstream-side range EA, and a range located upstream for the axis 83J of the turning shaft 83 (a range on the right side of FIG. 52) is referred to as upstream-side range EB.

A slight clearance is set along the entire circumference of the valve body 81 between the peripheral edge surface 81a of the valve body 81 and the inner wall surface 85a of the intake passage 85. The throttle valve 80 according to Embodiment 8 of the present invention is characterized in that a clearance dimension A between the valve body 81 and the inner wall surface 85a in the downstream-side range EA and a clearance dimension B between the valve body 81 and the inner wall surface 85a in the upstream-side range EB are set to be non-axisymmetric (not coincident) with respect to the axis 83J of the turning shaft 83. The following description will be given citing the clearance dimension A at the downstream-side end TA and the clearance dimension B at the upstream-side end TB as representative values of the clearance dimensions in both the ranges EA and EB, respectively.

Figure 56:
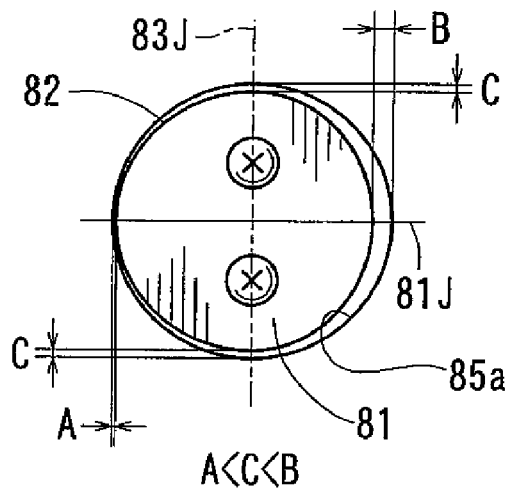
FIG. 56 is a plan view showing a relationship in size among clearances between a valve body and an inner wall surface of the intake passage exaggeratedly for the sake of understandability in Embodiment 8 of the present invention.

The clearance between the peripheral edge surface 81a and the inner wall surface 85a at the downstream-side end 81TA of the valve body 81 is set to the dimension A (the clearance A), and the clearance between the peripheral edge surface 81a and the inner wall surface 85a at the upstream-side end 81TB of the valve body 81 is set to the dimension B (the clearance B). In Embodiment 8 of the present invention, as shown in FIG. 56, the clearance A is set to be smaller than the clearance B (the clearance A<the clearance B). The clearance between a lateral portion of the valve body 81, which is located on the axis 83J and between the upstream-side end 81TB and the downstream-side end 81TA in the circumferential direction thereof, and the inner wall surface 85a is set to a dimension C (a clearance C). The clearance C is set to be larger than the clearance A and smaller than the clearance B (A<C<B). The diameter of the valve body 81 (the shape of the peripheral edge thereof) is set such that the clearance dimension between the peripheral edge of the valve body 81 and the inner wall surface 85a of the intake passage 85 changes continuously in the circumferential direction as described above. In FIG. 56, the dimensions of the clearances A, B, and C are illustrated exaggeratedly so that the relationship in size among the clearances A, B, and C can be understood with ease.

Thus, when the valve body 81 is fully closed, that area of the clearance closing member 82 which faces the downstream side of the intake passage 85 (lower than the valve body 81 of FIG. 53) and to which a negative pressure is applied (a pressure-receiving area S) is set to be equal in the downstream-side range EA and the upstream-side range EB (constant along the entire circumference) (a pressure-receiving area SA in the downstream-side range EA=a pressure-receiving area SB in the upstream-side range EB).

The full-closure position of the valve body 81 is set such that the valve body 81 is inclined with respect to the horizontal axis 85H by the angle θ, so the clearance closing member 82 is pressed against the inner wall surface 85a of the intake passage 85 at an incline in an inclined direction (diagonally upward or downward), and the outer periphery of the clearance closing member 82 is formed to have a semicircle in cross-section. Therefore, when the valve body 81 is fully closed, a contact point PA between the clearance closing member 82 and the inner wall surface 85a of the intake passage 85 in the downstream-side range EA is displaced in position to the upper surface side (upstream) with respect to a contact point PB between the clearance closing member 82 and the inner wall surface 85a of the intake passage 85 in the upstream-side range EB. This can be understood by referring to FIGS. 54 and 55, which show the downstream-side range EA and the upstream-side range EB respectively, for comparison. A distance from the peripheral edge surface 81a of the valve body 81 to each of the contact points PA and PB corresponds to a protruding dimension. By setting this protruding dimension axisymmetric with respect to the turning shaft 83 in the upstream-side range EB and the downstream-side range EA, the pressure-receiving areas in both the ranges can be equalized with each other (made constant along the entire circumference).

On the other hand, if the clearance between the peripheral edge surface 81a of the valve body 81 and the inner wall surface 85a of the intake passage 85 during full closure of the valve body 81 is equal in the downstream-side range EA and the upstream-side range EB (the clearance A=the clearance B), the protruding dimension of the clearance closing member 82 from the peripheral edge surface 81a is larger in the downstream-side range EA than in the upstream-side range EB. Therefore, as for the pressure-receiving area S of the clearance closing member 82, the pressure-receiving area SA in the downstream-side range EA is larger than the pressure-receiving area SB in the upstream-side range EB (SA>SB). As a result, the force received by the downstream-side range EA of the clearance closing member 82 (an external force received due to a negative pressure in the intake passage 85) is larger than the force received by the upstream-side range EB of the clearance closing member 82.

When the force received by the clearance closing member 82 is asymmetric with respect to the turning axis 83J of the turning shaft 83 in the downstream-side range EA and the upstream-side range EB during full closure of the valve body 81 (during an idling state of the engine) as described above, the pressing force (sealing force) with respect to the inner wall surface 85a of the intake passage 85 differs between both the ranges EA and EB. In consequence, the clearance closing member 82 tends to be sealed insufficiently or in a partially abraded manner, partially along the circumferential direction thereof.

In this respect, according to the throttle valve 80 of Embodiment 8 of the present invention, as regards to the clearance between the peripheral edge surface 81a of the valve body 81 and the inner wall surface 85a of the intake passage 85 during full closure of the valve body 81, the clearance A in the downstream-side range EA is set to be smaller than the clearance B in the upstream-side range EB (the clearance A<the clearance B), and the pressure-receiving area S of the clearance closing member 82 is set to be equal in the downstream-side range EA and the upstream-side range EB (SA=SB). Thus, the force received by the clearance closing member 82 and hence the pressing force with which the clearance closing member 82 is pressed against the inner wall surface 85a of the intake passage 85 are set to be equal in the downstream-side range EA (a pressing force PAP) and the upstream-side range EB (a pressing force PBP) with respect to the axis 83J (the pressing force PAP=the pressing force PBP).

As described above, according to the throttle valve 80 of Embodiment 8 of the present invention, the full-closure position of the valve body 81 is set such that the valve body 81 is inclined with respect to the horizontal axis 85H of the intake passage 85 by the angle θ, the clearance between the peripheral edge surface 81a of the valve body 81 and the inner wall surface 85a of the intake passage 85 is set to be smaller in the downstream-side range EA than in the upstream-side range EB, and the force received by the clearance closing member 82 is set to be equal between both the ranges EA and EB. Thus, the amounts of displacement, elastic deformation, and the like of the clearance closing member 82 are equal between both the ranges EA and EB. As a result, the sealability of the intake passage 85 during full closure of the valve body 81 can be enhanced, and partial abrasion of the clearance closing member 82 can be prevented.

Figure 57:
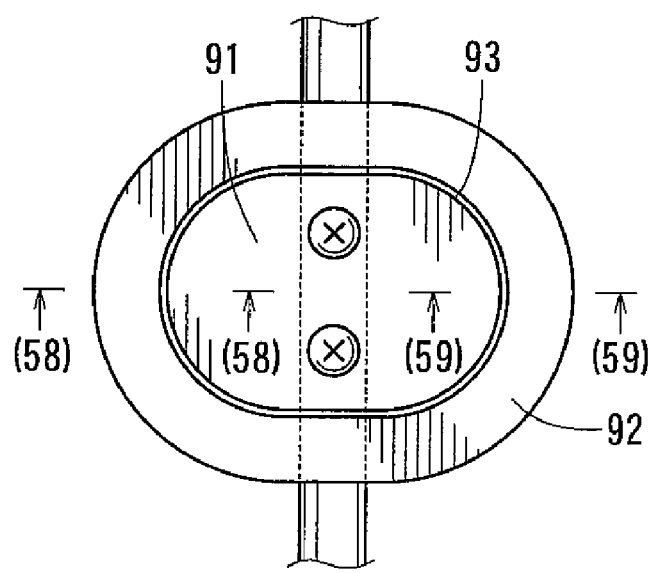
FIG. 57 is a plan view of a throttle valve according to Embodiment 9 of the present invention, which has an oblong valve body, and an intake passage.
Figure 58:
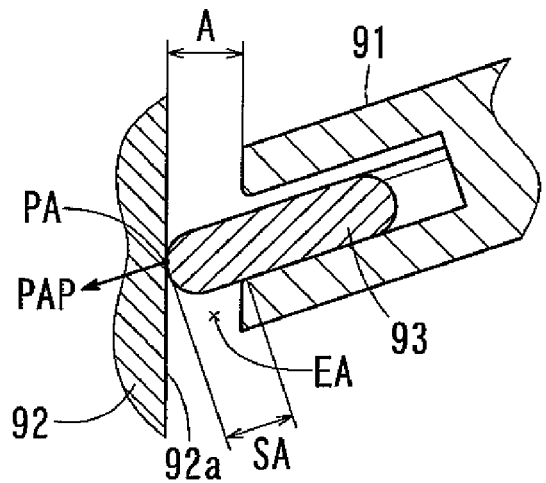
FIG. 58 is a sectional view on arrow taken along the line (58)-(58) of FIG. 57.
Figure 59:
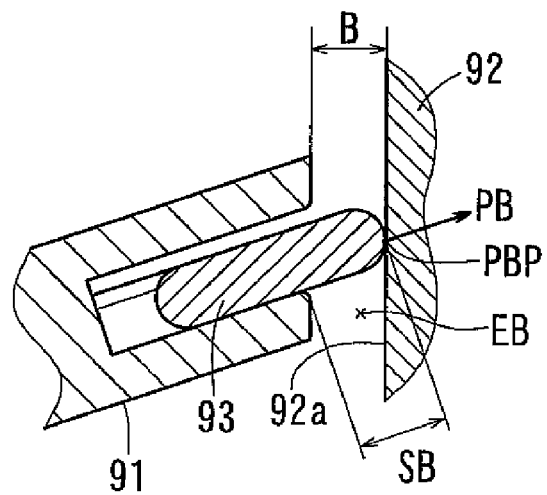
FIG. 59 is a sectional view on arrow taken along the line (59)-(59) of FIG. 57.

Embodiment 8 of the present invention described above can also be applied in the same manner to a throttle valve 90 according to Embodiment 9 of the present invention, which has an oblong valve body 91 as shown in FIGS. 57 to 59. As shown in FIGS. 57 to 59, the clearance A between the downstream-side end TA of the valve body 91 and an inner wall surface 92a of an intake passage 92 is set to be smaller than the clearance B between the upstream-side end TB of the valve body 91 and the inner wall surface 92a of the intake passage 92. Thus, the pressure-receiving area S of a clearance closing member 93 fitted along a peripheral edge of the valve body 91 is set to be equal in the downstream-side range EA and the upstream-side range EB, which are located downstream and upstream of an axis 94J of a turning shaft 94.

Thus, the amounts of displacement, elastic deformation, and the like of the clearance closing member 93 are equal in the downstream-side range EA and the upstream-side range EB. As a result, the sealability of the clearance closing member 93 against the inner wall surface 92a can be enhanced, and partial abrasion of the clearance closing member 93 can be suppressed.

The respective embodiments of the present invention described above can further be subjected to various modifications to be carried out. For instance, the throttle valves 10, 20, 30, 40, 50, 60, 70, 80, and 90, each of which is applied to the multi-arrayed variable intake valve device, are exemplified above. However, each of those throttle valves according to the respective embodiments of the present invention can also be applied as a throttle valve device or a single open/close valve for opening/closing an intake passage.

In each of Embodiments 1, 3, 5, 8, and 9 of the present invention, the clearance closing member may be separated into two pieces in the circumferential direction thereof. In each of Embodiments 2, 4, 6, and 7 of the present invention, the clearance closing member may be constructed as a single-piece member (which has a break at one point in the circumferential direction thereof).

Further, the integral valve body 31, 41, 51, 71, 81, or 91 according to each of Embodiments 3, 4, 5, 7, 8, and 9 of the present invention may be changed into a two-piece valve body as in the cases of Embodiments 2 and 6 of the present invention.

In each of the embodiments of the present invention, the clearance closing member may assume the shape of a continuous annular ring having no break.

Further, the construction in which the clearance closing member is provided along the entire circumference of the peripheral edge of the valve body is exemplified above. However, it is also appropriate to adopt a construction in which the clearance closing member is provided over a certain range along the peripheral edge of the valve body.

Furthermore, each of the clearance closing members 12, 32, 44, 53, 65, 82, and 93 according to the respective embodiments of the present invention which are exemplified above has a constant width and a constant board thickness (e.g., the width W12 and the board thickness d12). However, a region likely to be elastically deformed and a region unlikely to be elastically deformed can be set for each of those clearance closing members by changing the width thereof or the board thickness thereof over a suitable range in the circumferential direction thereof. Thus, each of the clearance closing members can be made more likely to fit in with the inner wall surface 2a of the intake passage 2 (with enhanced air-tightness).

In Embodiment 7 of the present invention, there is exemplified the construction in which the recess portions 73 to 73 for accumulating dust particles, which are large in number, are provided in each of both the surfaces of the clearance closing member 72 (the separate pieces 72U and 72D) in the board thickness direction thereof. However, it is also appropriate to adopt a construction in which the recess portions 73 are provided only in one of the surfaces of the clearance closing member 72 or a construction in which a plurality of those recess portions 73 to 73, communicate with one another to constitute a long continuous recess portion extending along the longitudinal direction of the clearance closing member 72. Further, it is also appropriate to adopt a construction in which those recess portions 73 to 73 are omitted. Furthermore, those recess portions 73 to 73 can also be applied to the respective clearance closing members 12, 32, 44, 53, 65, 82, and 93 according to the other embodiments of the present invention.

In addition, the valve body and the clearance closing member in each of the embodiments of the present invention can be manufactured from various materials such as metal, resin, or the like, and according to various methods such as press-molding of steel plates, machining of steel materials, integral molding of resin, and the like. By manufacturing the valve body or the clearance closing member from a resin such as nylon, fluoroplastics, or the like, the abrasion resistance, slidability, and sealability of the valve body or the clearance closing member can be enhanced in comparison with a case where the valve body or the clearance closing member is manufactured from a metal.

The invention claimed is:

1. A throttle valve comprising a clearance closing member provided along a peripheral edge of a valve body displaceably and elastically deformable in a direction extending along an axis of an intake passage, a direction perpendicular to the axis of the intake passage, and a direction inclined with respect to the axis of the intake passage, for closing a clearance between the peripheral edge of the valve body and an inner wall surface of the intake passage, wherein the clearance closing member is positioned along an entire circumference of the peripheral edge of the valve body, and wherein the clearance closing member is separated at least at one point in a circumferential direction thereof so that both ends of the clearance closing member are abutted against each other in a relatively displaceable state in a wall thickness direction thereof.

2. A throttle valve comprising a clearance closing member provided along a peripheral edge of a valve body displaceably and elastically deformable in a direction extending along an axis of an intake passage, a direction perpendicular to the axis of the intake passage, and a direction inclined with respect to the axis of the intake passage, for closing a clearance between the peripheral edge of the valve body and an inner wall surface of the intake passage, wherein the clearance closing member is positioned along an entire circumference of the peripheral edge of the valve body, wherein the clearance closing member is separated into a plurality of separate pieces along the peripheral edge of the valve body; and wherein the respective separate pieces are structured to be displaceable and elastically deformable independently of one another.

3. A throttle valve according to claim 2, wherein each of the separate pieces has an end that is positioned on an end of another of the separate pieces in a relatively displaceable state in a wall thickness direction thereof.

4. A throttle valve according to claim 2, wherein each of the separate pieces has a stopper portion for preventing dropout from the valve body.

5. A throttle valve according to claim 4, wherein:
the valve body has a groove portion provided along the peripheral edge thereof; and
the clearance closing member is positioned displaceably and elastically deformable within the groove portion.

6. A throttle valve according to claim 5, wherein:
the groove portion is structured to hold the clearance closing member is held is formed with a width larger than a wall thickness of the clearance closing member; and
the clearance closing member is positioned displaceably with respect to the valve body in a direction inclined with respect to the axis of the intake passage.

7. A throttle valve according to claim 6, wherein the clearance closing member and the groove portion for holding the clearance closing member have corner portions chamfered in a circular shape in cross-section.

8. A throttle valve according to claim 7, wherein the clearance closing member is positioned on an inner periphery side, and includes a recess portion for accommodating a foreign matter entering the groove portion.

* * * * *